(12) United States Patent
Lee et al.

(10) Patent No.: US 9,465,260 B2
(45) Date of Patent: *Oct. 11, 2016

(54) DISPLAY DEVICE AND MANUFACTURING METHOD THEREOF

(71) Applicant: Samsung Display Co., Ltd., Yongin, Gyeonggi-Do (KR)

(72) Inventors: Seon Uk Lee, Seongnam-si (KR); Nam Seok Roh, Seongnam-si (KR); Sung Hwan Won, Suwon-si (KR); Woo Jae Lee, Yongin-si (KR); Kyung Tae Chae, Hwaseong-si (KR)

(73) Assignee: SAMSUNG DISPLAY CO., LTD. (KR)

( * ) Notice: Subject to any disclaimer, the term of this patent is extended or adjusted under 35 U.S.C. 154(b) by 162 days.

This patent is subject to a terminal disclaimer.

(21) Appl. No.: 14/062,119

(22) Filed: Oct. 24, 2013

(65) Prior Publication Data

US 2014/0307215 A1     Oct. 16, 2014

(30) Foreign Application Priority Data

Apr. 11, 2013 (KR) .................. 10-2013-0039884

(51) Int. Cl.
*G02F 1/1341* (2006.01)
*G02F 1/1333* (2006.01)

(52) U.S. Cl.
CPC ....... *G02F 1/1341* (2013.01); *G02F 1/133377* (2013.01)

(58) Field of Classification Search
CPC ....................... G02F 1/1339; G02F 1/1341
See application file for complete search history.

(56) References Cited

U.S. PATENT DOCUMENTS

| | | | | |
|---|---|---|---|---|
| 8,896,801 B2 * | 11/2014 | Lim et al. | ...................... | 349/154 |
| 9,019,458 B2 * | 4/2015 | Kim et al. | ...................... | 349/154 |
| 2012/0062448 A1 * | 3/2012 | Kim et al. | ....................... | 345/55 |
| 2014/0160419 A1 * | 6/2014 | Lee et al. | ...................... | 349/154 |

FOREIGN PATENT DOCUMENTS

KR     1020120026880 A     3/2012

* cited by examiner

*Primary Examiner* — Dung Nguyen
(74) *Attorney, Agent, or Firm* — Innovation Counsel LLP

(57) ABSTRACT

Provided are a display device and a manufacturing method thereof capable of preventing deformation of a microcavity and stably injecting an aligning agent and a liquid crystal. The display device includes a substrate including a plurality of pixel areas which includes a plurality of pixel columns and is disposed in a matrix form; a thin film transistor formed on the substrate; a pixel electrode connected to the thin film transistor and formed in the pixel area; a roof layer formed on the pixel electrode so as to be spaced apart from the pixel electrode with a microcavity therebetween; a first injection hole formed in the roof layer exposing the microcavity at a side edge of the pixel column; a liquid crystal layer filling the microcavity; and an encapsulation layer formed on the roof layer so as to cover the first injection hole to seal the microcavity.

16 Claims, 26 Drawing Sheets

DISPLAY DEVICE AND MANUFACTURING METHOD THEREOF

CROSS-REFERENCE TO RELATED APPLICATION

This application claims priority to and the benefit of Korean Patent Application No. 10-2013-0039884 filed in the Korean Intellectual Property Office on Apr. 11, 2013, the entire contents of which are incorporated herein by reference.

BACKGROUND (a) Technical Field

The present invention relates to a display device and a manufacturing method thereof, and more particularly, to a display device capable of preventing deformation of a microcavity and stably injecting an aligning agent and a liquid crystal, and a manufacturing method thereof.

(b) Description of the Related Art

Liquid crystal displays are one of the most common types of flat panel displays currently in use. Liquid crystal displays include two display panels with field generating electrodes, such as a pixel electrode, a common electrode, and the like, and a liquid crystal layer interposed therebetween. An electric field is generated in the liquid crystal layer by applying a voltage to the field generating electrodes. The generated electric field aligns the liquid crystal molecules of the liquid crystal layer, and through control of the polarization of light incident onto and which travels through the display panels, images are displayed.

The two display panels may include a thin film transistor array panel and an opposing display panel. In the thin film transistor array panel, a gate line transferring a gate signal and a data line transferring a data signal are formed to cross each other, and a thin film transistor connected with the gate line and the data line, a pixel electrode connected with the thin film transistor, and the like may be formed. In the opposing display panel, a light blocking member, a color filter, a common electrode, and the like may be formed. In some cases, the light blocking member, the color filter, and the common electrode may be formed on the thin film transistor array panel.

However, in a liquid crystal display in the related art, two sheets of substrates are necessarily used for the two display panels, and respective constituent elements are formed on the two sheets of substrates, and as a result, there are problems in that the display device is heavy and thick, has high cost, and takes a long processing time.

The above information disclosed in this Background section is only for enhancement of understanding of the background of the disclosure and therefore it may contain information that does not form the prior art that is already known in this country to a person of ordinary skill in the art.

SUMMARY

A display device and a manufacturing method thereof are provided having advantages of reducing a weight, a thickness, cost, and a processing time by manufacturing the display device by using one substrate.

Further, a display device and a manufacturing method thereof are provided having advantages of preventing a shape of a microcavity from being deformed during a manufacturing process, and preventing a defect from occurring when an aligning agent and a liquid crystal are injected.

A display device includes: a substrate including a plurality of pixel areas disposed in a matrix which includes a plurality of pixel columns; a thin film transistor formed on the substrate; a pixel electrode connected to the thin film transistor and formed in the pixel area; a roof layer formed on the pixel electrode so as to be spaced apart from the pixel electrode; a microcavity between the roof layer and the pixel electrode; a first injection hole formed in the roof layer exposing the microcavity at a side edge of the pixel column; a liquid crystal layer filling the microcavity; and an encapsulation layer formed on the roof layer and covering the first injection hole to seal the microcavity.

The microcavity may have a tunnel shape, which extends along the pixel column.

The roof layer may include an upper part covering an upper surface of the microcavity, and a side wall part covering a side surface of the microcavity.

The upper part may be formed along the pixel column, and the side wall part may be formed between adjacent pixel columns.

The display device may further include an additional first injection hole formed at a second side edge of the pixel column opposite the side edge where the first injection hole is positioned.

The display device may further include an opening formed at the upper part of the roof layer exposing the microcavity.

The opening may be positioned on the thin film transistor, or between the vertically adjacent pixel areas.

The display device may further include a second injection hole formed in the roof layer exposing the microcavity between the adjacent pixel columns.

The second injection hole positioned at a left side of the pixel column may be different from the second injection hole positioned at a right side of the pixel column in a shape or a size.

The formation position of the second injection hole positioned at the left side of the pixel column and the formation position of the second injection hole positioned at the right side of the pixel column may be asymmetrical to each other.

The display device may further include a passage formed through the side wall part connecting the microcavities positioned in different pixel columns.

The microcavity may be formed in a quadrangle including short sides corresponding to a length of one side of the pixel area and long sides corresponding to a length of the pixel column.

The long sides of the microcavities positioned in the different pixel columns may have different lengths.

The first injection holes may be formed at a side edges of some pixel columns among the plurality of pixel columns, but may not be formed at side edges of a remainder of the plurality of the pixel columns.

The shape of the first injection hole may be a reverse triangle.

The display device may further include a color filter overlapped with the pixel electrode; and a light blocking member overlapped with the thin film transistor, in which a height of the color filter may be larger than a height of the light blocking member.

A manufacturing method of a display device includes: forming a thin film transistor on a substrate including a plurality of pixel areas disposed in a matrix form which includes a plurality of pixel columns; forming a pixel electrode connected with the thin film transistor in the pixel area; forming sacrificial layers connected to each other on the pixel electrode along the plurality of pixel columns;

forming a roof layer on the sacrificial layer; forming a first injection hole by patterning the roof layer so that a part of the sacrificial layer positioned at a side edge of the pixel column is exposed; forming a microcavity between the pixel electrode and the roof layer by removing the sacrificial layer; forming a liquid crystal layer in the microcavity by injecting a liquid crystal material through the first injection hole; and forming an encapsulation layer on the roof layer to seal the microcavity.

The microcavity may have a tunnel shape, which extends along the pixel column.

In the forming of the first injection hole, the first injection hole may be formed by patterning the roof layer so that a part of the sacrificial layer positioned at each side edge of the pixel column is exposed.

In the forming of the sacrificial layer, connection bridges connecting the sacrificial layers positioned in different pixel columns may be further formed, and in the forming of the first injection hole, a second injection hole may be further formed by patterning the roof layer so as to expose the connection bridge.

In the display device and the manufacturing method thereof according to the example embodiments, it is possible to reduce a weight, a thickness, cost, and a processing time by manufacturing the display device by using one substrate.

Further, the microcavity is formed in a tunnel shape, which extends along a pixel column, and a first injection hole exposing the microcavity is formed at a side edge or each side edge of the pixel column, and as a result, it is possible to prevent deformation of the microcavity and stably inject an aligning agent and a liquid crystal.

DETAILED DESCRIPTION OF THE EMBODIMENTS

Figure 1:
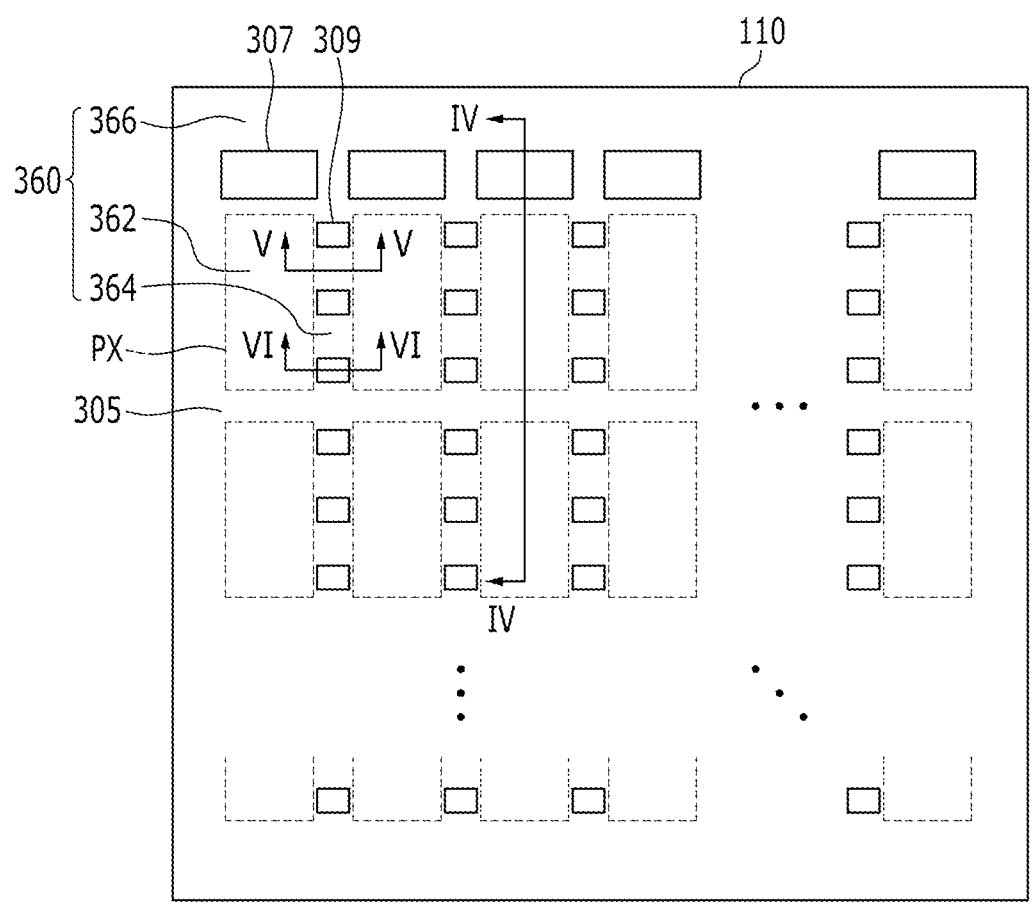
FIG. 1 is a plan view illustrating a display device according to an example embodiment.

The present disclosure will be described more fully hereinafter with reference to the accompanying drawings, in which example embodiments are shown. As those skilled in the art would realize, the described embodiments may be modified in various different ways, all without departing from the spirit or scope of the present disclosure.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element, or intervening elements may also be present. In contrast, when an element is referred to as being "directly on" another element, there are no intervening elements present.

First, a display device according to an example embodiment will be schematically described below with reference to the accompanying drawings.

Figure 2:
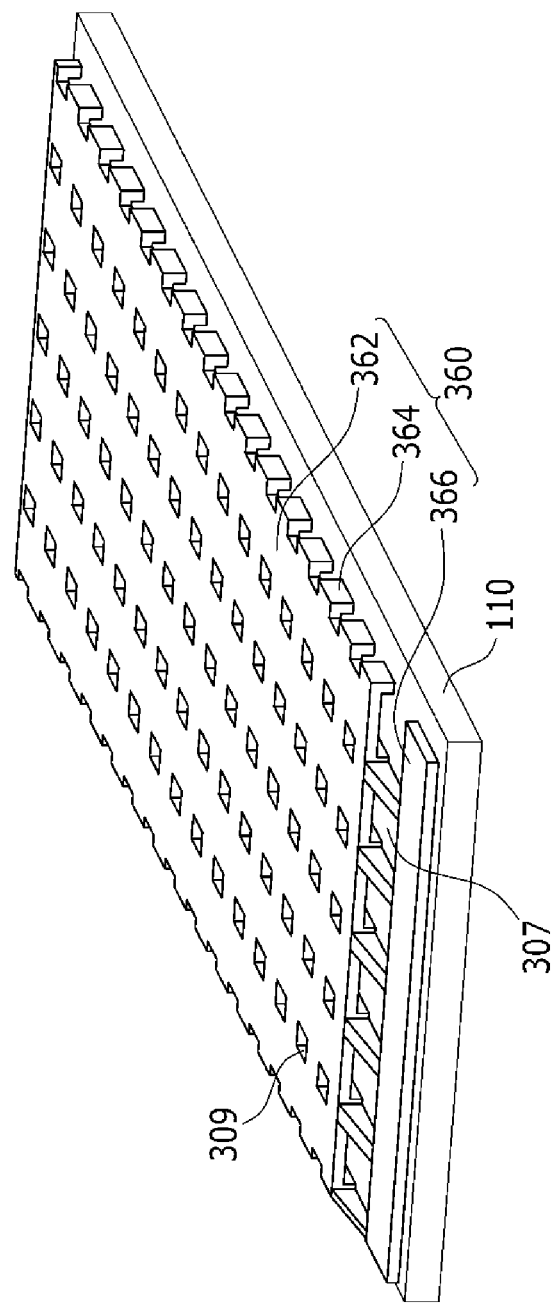
FIG. 2 is a perspective view illustrating a part of the display device according to an example embodiment.

FIG. 1 is a plan view illustrating a display device according to an example embodiment, and FIG. 2 is a perspective view illustrating a part of the display device according to an example embodiment. For convenience, only some constituent elements are illustrated in FIGS. 1 and 2.

A display device according to an example embodiment includes a substrate 110 made of a material such as glass or plastic, and a roof layer 360 formed on the substrate 110.

The substrate 110 includes a plurality of pixel areas PX. The plurality of pixel areas PX are disposed in a matrix form, which includes a plurality of pixel rows and a plurality of pixel columns.

The roof layer 360 is formed to be spaced apart from the substrate 110 in a plurality of pixel columns, and a microcavity 305 is formed below the roof layer 360.

The roof layer 360 includes an upper part 362 covering an upper surface of the microcavity 305 and a side wall part 364 covering a side surface of the microcavity 305.

The upper part 362 is formed along the pixel column. The side wall part 364 is formed between the adjacent pixel columns. For example, the upper parts 362 are formed in a first pixel column, a second pixel column, and a third pixel column, respectively, and the side wall part 364 is formed on a boundary between the first pixel column and the second pixel column, and on a boundary between the second pixel column and the third pixel column. The upper part 362 is formed to be spaced apart from the substrate 110, and the side wall part 364 is formed to be attached to the substrate 110. Accordingly, the microcavity 305 has a form surrounded by the roof layer 360 for each pixel column. That is, the microcavity 305 has a tunnel shape, which is penetrated along the pixel column.

The roof layer 360 may further include an outer part 366 formed at an edge of the substrate 110.

The outer part 366 is formed at an edge of the substrate 110 so as to surround the whole pixel areas PX. The outer part 366 extends from the side wall part 364 and is attached to the substrate 110. Because the upper part 362, which occupies a large part of the roof layer 360, is spaced apart from the substrate 110, the roof layer 360 may become detached from the substrate 110. The outer part 366 is attached to the substrate 110 to thereby serve to prevent the roof layer 360 from detaching from the substrate 110.

At one-side edge of the pixel column, a first injection hole 307 is formed in the roof layer 360 so as to expose the microcavity 305. The first injection hole 307 may be further formed at the opposite edge of the pixel column. That is, at both-side edges of the pixel column, the first injection holes 307 are formed in the roof layer 360 so as to expose the microcavity 305.

Between the adjacent pixel columns, a second injection hole 309 is further formed in the roof layer 360 so as to expose the microcavity 305. A plurality of side wall parts 364 is formed between the adjacent pixel columns at predetermined distances, and the second injection holes 309 are formed among the plurality of side wall parts 364. Accordingly, the side wall parts 364 and the second injection holes 309 are alternately formed among the adjacent pixel columns.

Next, one pixel of the display device according to an example embodiment will be described below with reference to FIGS. 1 to 6.

Figure 3:
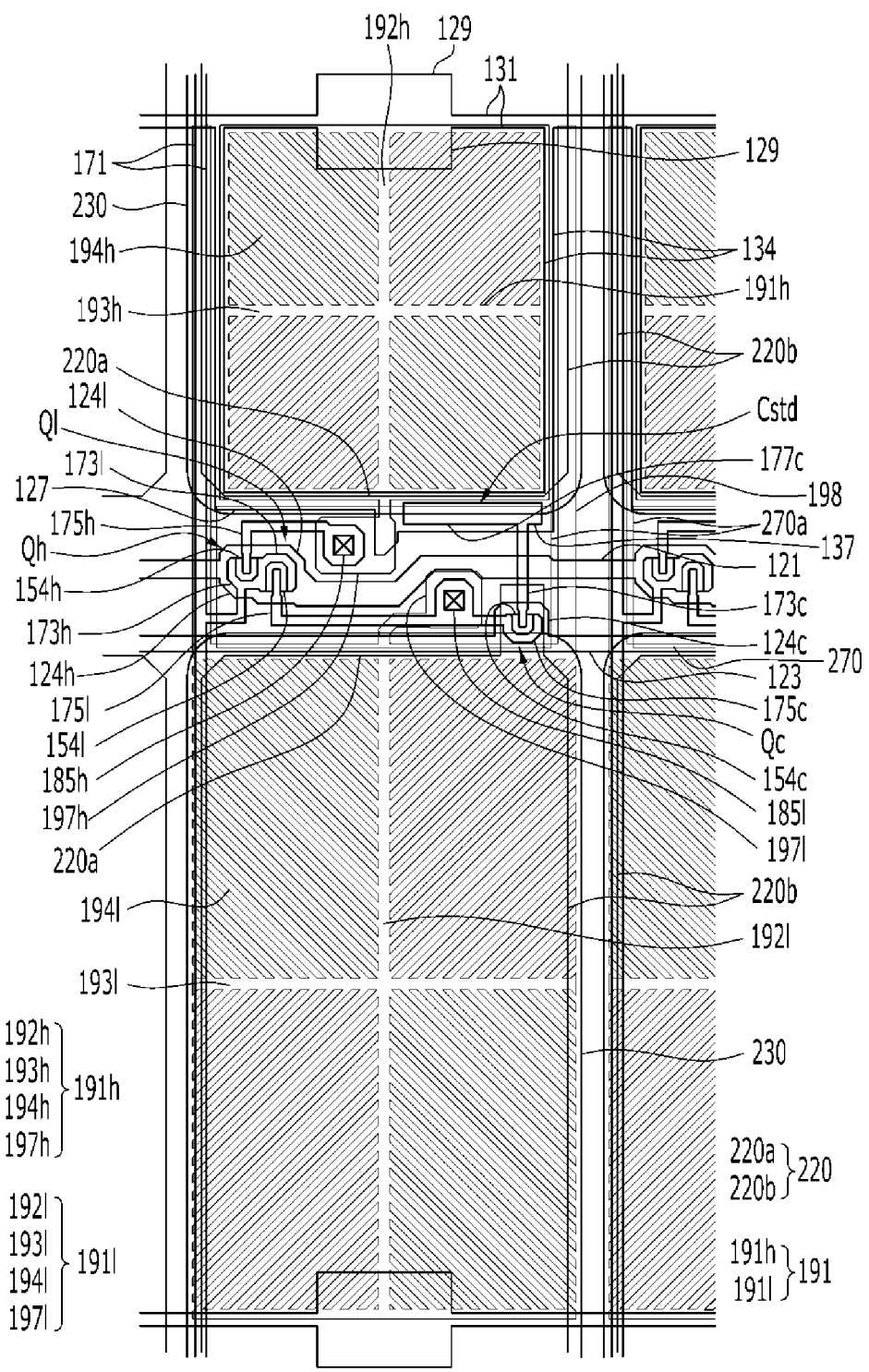
FIG. 3 is a plan view illustrating one pixel of the display device according to an example embodiment.
Figure 4:
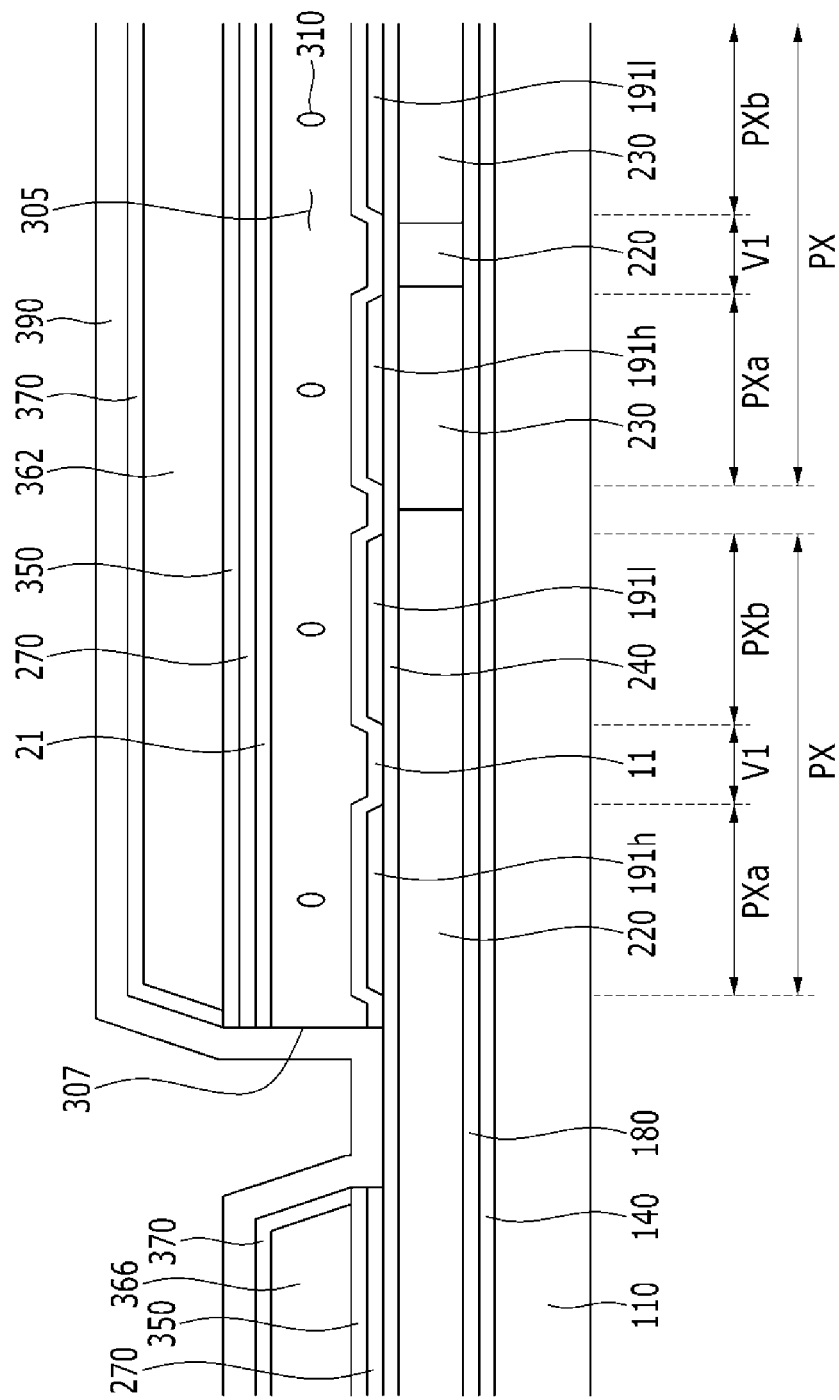
FIG. 4 is a cross-sectional view illustrating a part of the display device taken along line IV-IV of FIG. 1 according to an example embodiment.
Figure 5:
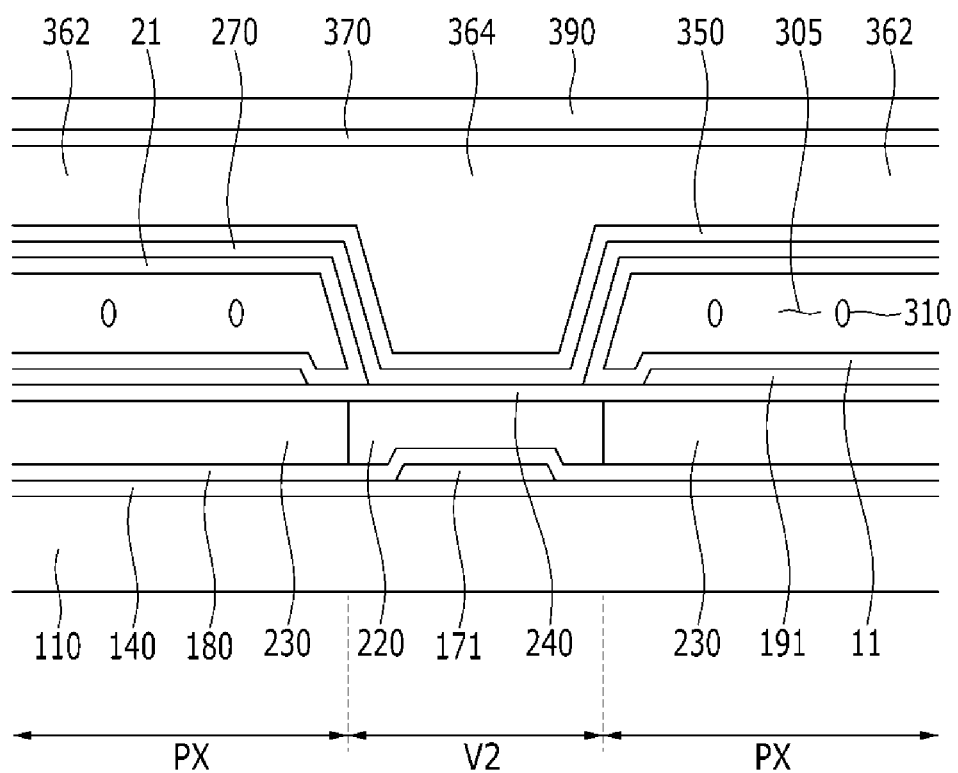
FIG. 5 is a cross-sectional view illustrating a part of the display device taken along line V-V of FIG. 1 according to an example embodiment.
Figure 6:
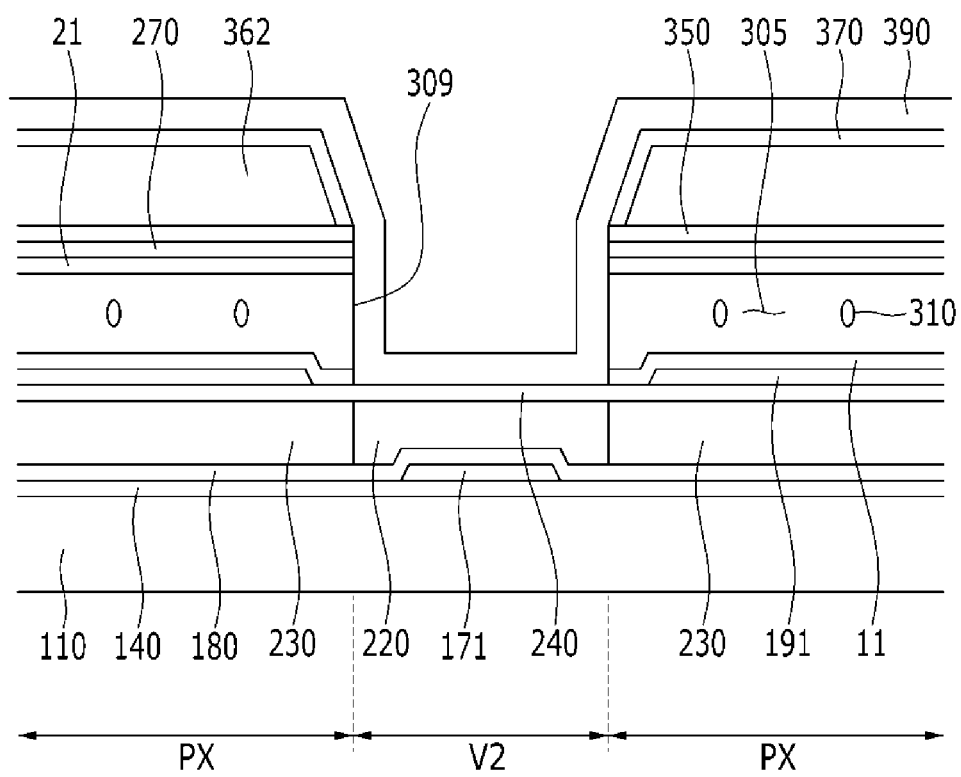
FIG. 6 is a cross-sectional view illustrating a part of the display device taken along line VI-VI of FIG. 1 according to an example embodiment.
Figure 7:
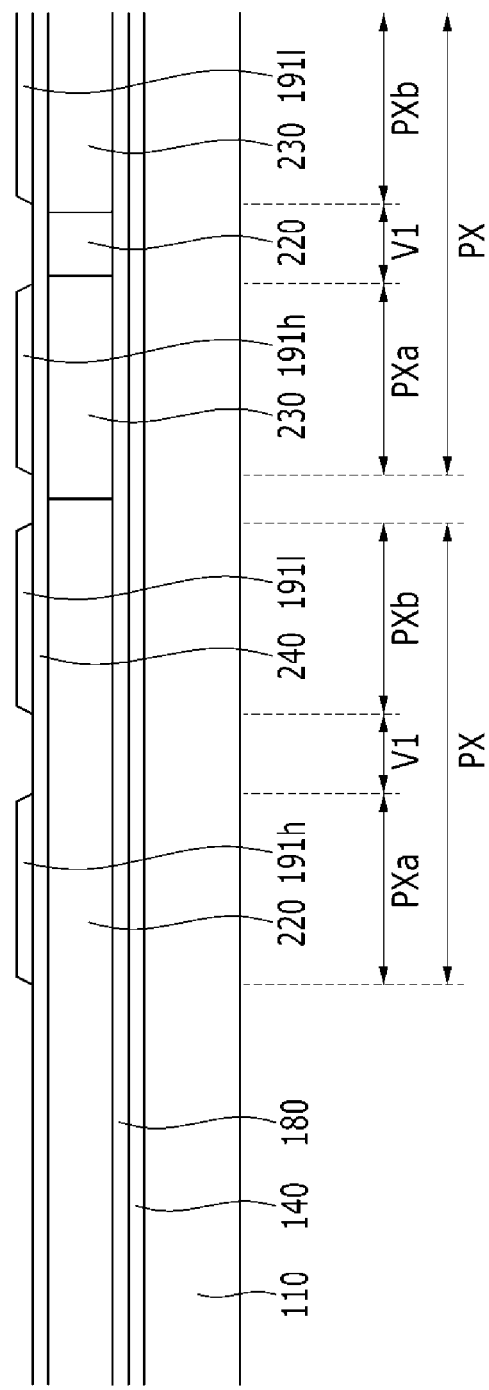
FIGS. 7 to 18 are process cross-sectional views illustrating a manufacturing method of a display device according to an example embodiment.
Figure 8:
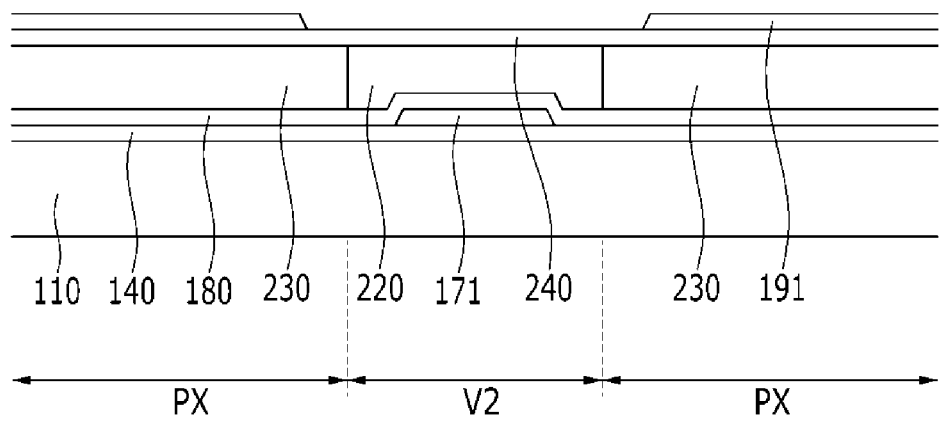

FIG. 3 is a plan view illustrating one pixel of the display device according to an example embodiment, and FIG. 4 is a cross-sectional view illustrating a part of the display device taken along line IV-IV of FIG. 1. FIG. 5 is a cross-sectional view illustrating a part of the display device taken along line V-V of FIG. 1, and FIG. 6 is a cross-sectional view illustrating a part of the display device taken along line VI-VI of FIG. 1.

Referring to FIGS. 1 to 6, a plurality of gate conductors including a plurality of gate lines 121, a plurality of step-down gate lines 123, and a plurality of storage electrode lines 131 are formed on the substrate 110.

The gate lines 121 and the step-down gate lines 123 mainly extend in a horizontal direction to transfer gate signals. The gate conductor further includes a first gate electrode 124h and a second gate electrode 124l, each protruding upward and downward from the gate line 121. The gate conductor further includes a third gate electrode 124c protruding upward from the step-down gate line 123. The first gate electrode 124h and the second gate electrode 124l are connected with each other to form a single protrusion. The form of the protrusions of the first, second, and third gate electrodes 124h, 124l, and 124c may be modified.

The storage electrode line 131 mainly extends in a horizontal direction to transfer a predetermined voltage, such as a common voltage Vcom. The storage electrode line 131 includes storage electrodes 129 protruding upward and downward, a pair of vertical portions 134 extending downward to be substantially vertical to the gate line 121, and a horizontal portion 127 connecting ends of the pair of vertical portions 134 with each other. The horizontal portion 127 includes a capacitor electrode 137 expanded downward.

A gate insulating layer 140 is formed on the gate conductor 121, 123, 124h, 124l, 124c, and 131. The gate insulating layer 140 may be made, for example, of an inorganic insulating material such as silicon nitride (SiNx) and silicon oxide (SiOx). Further, the gate insulating layer 140 may be constituted by a single layer or may include multiple layers.

A first semiconductor 154h, a second semiconductor 154l, and a third semiconductor 154c are formed on the gate insulating layer 140. The first semiconductor 154h may be positioned on the first gate electrode 124h, the second semiconductor 154l may be positioned on the second gate electrode 124l, and the third semiconductor 154c may be positioned on the third gate electrode 124c. The first semiconductor 154h and the second semiconductor 154l may be connected to each other, and the second semiconductor 154l and the third semiconductor 154c may be connected to each other. Further, the first semiconductor 154h may be extended to the lower portion of the data line 171. The first to third semiconductors 154h, 154l, and 154c may be made, for example, of amorphous silicon, polycrystalline silicon, metal oxide, and the like.

Ohmic contacts (not illustrated) may be further formed on the first to third semiconductors 154h, 154l, and 154c, respectively. The ohmic contact may be made, for example, of silicide or a material such as n+ hydrogenated amorphous silicon in which an n-type impurity is doped at high concentration.

A data conductor including a data line 171, a first source electrode 173h, a second source electrode 173l, a third source electrode 173c, a first drain electrode 175h, a second drain electrode 175l, and a third drain electrode 175c is formed on the first to third semiconductors 154h, 154l, and 154c.

The data line 171 transfers a data signal and mainly extends in a vertical direction to cross the gate line 121 and the step-down gate line 123. Each data line 171 includes a first source electrode 173h and a second source electrode 173l which extend toward the first gate electrode 124h and the second gate electrode 124l and are connected with each other.

Each of the first drain electrode 175h, the second drain electrode 175l, and the third drain electrode 175c includes one end portion that is wide and an opposite end portions that is rod-shaped. The rod-shaped end portions of the first drain electrode 175h and the second drain electrode 175l are partially surrounded by the first source electrode 173h and the second source electrode 173l. One wide end portion of the second drain electrode 175l is again extended to form a third source electrode 173c which is curved in a 'U'-lettered shape. A wide end portion 177c of the third drain electrode 175c is overlapped with the capacitor electrode 137 to form a step-down capacitor Cstd, and the rod-shaped end portion is partially surrounded by the third source electrode 173c.

The first gate electrode 124h, the first source electrode 173h, and the first drain electrode 175h form a first thin film transistor Qh together with the first semiconductor 154h. The second gate electrode 124l, the second source electrode 173l, and the second drain electrode 175l form a second thin film transistor Ql together with the second semiconductor 154l. The third gate electrode 124c, the third source electrode 173c, and the third drain electrode 175c form the third thin film transistor Qc together with the third semiconductor 154c.

The first semiconductor 154h, the second semiconductor 154l, and the third semiconductor 154c are connected to each other to have a stripe shape, and may have substantially the same plane shape as the data conductor 171, 173h, 173l, 173c, 175h, 175l, and 175c and the ohmic contacts therebelow, except for channel regions between the source electrodes 173h, 173l, and 173c and the drain electrodes 175h, 175l, and 175c.

In the first semiconductor 154h, an exposed portion which is not covered by the first source electrode 173h and the first drain electrode 175h is disposed between the first source electrode 173h and the first drain electrode 175h. In the second semiconductor 154l, an exposed portion which is not covered by the second source electrode 173l and the second drain electrode 175l is disposed between the second source electrode 173l and the second drain electrode 175l. In addition, in the third semiconductor 154c, an exposed portion which is not covered by the third source electrode 173c and the third drain electrode 175c is disposed between the third source electrode 173c and the third drain electrode 175c.

A passivation layer 180 is formed on the data conductor 171, 173h, 173l, 173c, 175h, 175l, and 175c and the semiconductors 154h, 154l, and 154c exposed between the respective source electrodes 173h, 173l, 173c and the respective drain electrodes 175h, 175l, 175c. The passivation layer 180 may be made, for example, of an organic insulating material or an inorganic insulating material, and may be formed in a single layer or may include multiple layers.

A color filter 230 is formed on the passivation layer 180 in each pixel area PX, with the exception of a pixel area PX positioned at a side edge of each pixel column, in which, as shown in FIG. 4, the color filter may be omitted Each pixel area PX may include a first subpixel area PXa and a second subpixel area PXb. The first subpixel area PXa and the second subpixel area PXb may be vertically disposed (i.e. in a column direction). A first valley V1 is positioned between the first subpixel area PXa and the second subpixel area PXb in a pixel row direction, and a second valley V2 is positioned between a plurality of pixel columns.

The color filters 230 are formed in the first subpixel area PXa and the second subpixel area PXb. As shown in FIG. 4, the color filter 230 may not be formed in the pixel area PX which is positioned at a side edge of each pixel column.

Each color filter 230 may display one of a set of primary colors such as the three primary colors of red, green and blue. The color filter 230 is not limited to the three primary colors of red, green and blue, but may display cyan, magenta, yellow, and white-based colors. In an alternative arrangement, the color filter 230 may be elongated in a column direction along a space between the adjacent data lines 171 so that the area under first valley V1 includes the color filter 230.

A light blocking member 220 is formed in a region between the adjacent color filters 230. The light blocking member 220 is formed on a boundary of the pixel area PX and the thin film transistor to prevent light leakage. The light blocking member 220 includes (FIG. 3) a horizontal light blocking member 220a which extends along the gate line 121 and the step-down gate line 123, and covers regions in which the first thin film transistor Qh, the second thin film transistor Ql, and the third thin film transistor Qc are positioned, and a vertical light blocking member 220b which extends along the data line 171. That is, the horizontal light blocking member 220a may be formed at the first valley V1, and the vertical light blocking member 220b may be formed at the second valley V2. The color filter 230 and the light blocking member 220 may be overlapped with each other in a partial region.

The light blocking member 220 may be further formed in the pixel area PX which is positioned at a side edge of each pixel column. The first injection hole 307 is formed at the one-side edge of each pixel column, and an aligning agent, a liquid crystal, and the like may be injected through the first injection hole 307. In the injecting process, the pixel area PX which is positioned at the one-side edge of each pixel column may be contaminated, and the contamination of that pixel area may be hidden from view by forming the light blocking member 220 at the pixel area PX positioned at the side-edge of each pixel column.

A first insulating layer 240 may be further formed on the color filter 230 and the light blocking member 220. The first insulating layer 240 may be made, for example, of an inorganic insulating material such as silicon nitride (SiNx) and silicon oxide (SiOx). The first insulating layer 240 serves to protect the color filter 230 and the light blocking member 220 which are made of the organic materials, and may be omitted if necessary.

A plurality of first contact holes 185h and a plurality of second contact holes 185l, which expose the wide end portion of the first drain electrode 175h and the wide end portion of the second drain electrode 175l, respectively, are formed in the first insulating layer 240, the light blocking member 220, and the passivation layer 180.

A pixel electrode 191 is formed on the first insulating layer 240. The pixel electrode 191 may be made, for example, of a transparent metal material such as indium tin oxide (ITO) and indium zinc oxide (IZO).

The pixel electrode 191 includes the first subpixel electrode 191h and the second subpixel electrode 191l, which are separated from each other with the gate line 121 and the step-down gate line 123 therebetween, and are disposed above and below the pixel area PX, based on the gate line 121 and the step-down gate line 123, to be adjacent to each other in a column direction. That is, the first subpixel electrode 191h and the second subpixel electrode 191l are separated from each other with the first valley V1 therebetween. The first subpixel electrode 191h is positioned in the first subpixel area PXa, and the second subpixel electrode 191l is positioned in the second subpixel area PXb.

The first subpixel electrode 191h and the second subpixel electrode 191l are connected with the first drain electrode 175h and the second drain electrode 175l through the first contact hole 185h and the second contact hole 185l, respectively. Accordingly, when the first thin film transistor Qh and the second thin film transistor Ql are turned on, the first thin film transistor Qh and the second thin film transistor Ql receive data voltages from the first drain electrode 175h and the second drain electrode 175l.

An overall shape of each of the first subpixel electrode 191h and the second subpixel electrode 191l is a quadrangle, and the first subpixel electrode 191h and the second subpixel electrode 191l include cross stems including horizontal stems 193h and 193l and vertical stems 192h and 192l crossing the horizontal stems 193h and 193l, respectively. Further, the first subpixel electrode 191h and the second subpixel electrode 191l include a plurality of minute branches 194h and 194l, and protrusions 197h and 197l protruding upward or downward from edge sides of the subpixel electrodes 191h and 191l, respectively.

The pixel electrode 191 is divided into four subregions by the horizontal stems 193h and 193l and the vertical stems 192h and 192l. The minute branches 194h and 194l obliquely extend from the horizontal stems 193h and 193l and the vertical stems 192h and 192l, and the extending direction may form an angle of approximately 45 degrees or 135 degrees with the gate line 121 or the horizontal stems 193h and 193l. Further, directions in which the minute branches 194h and 194l of the two adjacent subregions extend may be perpendicular to each other.

In an example embodiment, the first subpixel electrode 191h further includes an outer stem surrounding the outside, and the second subpixel electrode 191l further includes horizontal portions positioned at an upper end and a lower end, and left and right vertical portions 198 positioned at the left and the right of the first subpixel electrode 191h. The left and right vertical portions 198 may prevent capacitive bonding, that is, coupling between the data line 171 and the first subpixel electrode 191h.

The structure of the thin film transistor and the shape of the pixel electrode described above are an example, and the present disclosure is not limited thereto and may be variously modified.

A common electrode 270 is formed on the pixel electrode 191 so as to be spaced apart from the pixel electrode 191 at a regular distance. A microcavity 305 is formed between the pixel electrode 191 and the common electrode 270. That is, the microcavity 305 is surrounded by the pixel electrode 191 and the common electrode 270. Various modifications of this arrangement are possible. For example, in an alternative arrangement, the common electrode 270 may be formed with an insulating layer between the common electrode 270 and the pixel electrode 191. In this case, the microcavity 305 is not formed between the pixel electrode 191 and the common electrode 270, but the microcavity 305 is formed on the common electrode 270. A width and an area of the microcavity 305 may be variously modified according to resolution of the display device.

The common electrode 270 may be made, for example, of a transparent metal material such as indium tin oxide (ITO) and indium zinc oxide (IZO). A predetermined voltage may be applied to the common electrode 270, and an electric field may be generated between the pixel electrode 191 and the common electrode 270.

A liquid crystal layer configured by liquid crystal molecules 310 is formed in the microcavity 305 positioned between the pixel electrode 191 and the common electrode 270. The liquid crystal molecules 310 have negative dielectric anisotropy and may stand up in a vertical direction to the substrate 110 while the electric field is not applied. That is, vertical alignment may be performed.

A first alignment layer 11 is formed on the pixel electrode 191. The first alignment layer 11 may also be formed on the first insulating layer 240 which is not covered by the pixel electrode 191.

A second alignment layer 21 is formed below the common electrode 270 to face the first alignment layer 11.

The first alignment layer 11 and the second alignment layer 21 may be formed by vertical alignment layers and made, for example, of materials such as polyamic acid, polysiloxane, and polyimide. The first and second alignment layers 11 and 21 may be connected to each other at the edge of the pixel area PX (FIG. 5).

The first subpixel electrode 191h and the second subpixel electrode 191l to which the data voltages are applied generate an electric field together with a common electrode 270 to determine the orientation directions of the liquid crystal molecules 310 positioned in the microcavity 305 between the two electrodes 191 and 270. As such, luminance of light passing through the liquid crystal layer varies according to the determined orientation directions of the liquid crystal molecules 310.

A second insulating layer 350 may be further formed on the common electrode 270. The second insulating layer 350 may be made, for example, of an inorganic insulating material such as silicon nitride (SiNx) and silicon oxide (SiOx) and may be omitted if necessary.

A roof layer 360 is formed on the second insulating layer 350. The roof layer 360 may be made, for example, of an organic material. The microcavity 305 is formed below the roof layer 360, and a shape of the microcavity 305 may be maintained by the roof layer 360. The roof layer 360 is formed to be spaced apart from the pixel electrode 191 with the microcavity 305 therebetween.

As described above with respect to FIG. 2, the roof layer 360 includes an upper part 362 (FIGS. 4, 5 and 6) covering an upper surface of the microcavity 305, a side wall part 364 (FIG. 5) covering a side surface of the microcavity 305, and an outer part 366 (FIG. 4) formed at the edge of the substrate 110.

The upper part 362 is formed in each pixel area PX and the first valley V1 along a pixel column, and the microcavity 305 is formed below the upper part 362. The side wall part 364 is formed at the second valley V2, and a plurality of side wall parts 364 are disposed at predetermined distances. The microcavity 305 is not formed below the side wall part 364, but the side wall part 364 extend downward, towards the substrate 110, between the microcavity. Accordingly, a thickness of the side wall part 364 may be larger than that of the upper part 362. Since the upper surface and both sides of the microcavity 305 are covered by the roof layer 360, the microcavity 305 has a tunnel shape, which penetrates along the pixel column.

A first injection hole 307 (FIG. 4) and a second injection hole 309 (FIG. 6) which expose a part of the microcavity 305 are formed through the roof layer 360.

At a side edge of the pixel column, the first injection hole 307 is formed in the roof layer 360 so as to expose the microcavity 305. The first injection hole 307 may be formed at both side edges of the pixel column.

Between the adjacent pixel columns, the second injection hole 309 is formed in the roof layer 360 so as to expose the microcavity 305. The second injection hole 309 may be positioned at the second valley V2.

Because the microcavity 305 is exposed by the first injection hole 307 and the second injection hole 309, an aligning agent or a liquid crystal material may be injected into the microcavity 305 through the first injection hole 307 or the second injection hole 309.

A third insulating layer 370 may be further formed on the roof layer 360. The third insulating layer 370 may be made, for example, of an inorganic insulating material such as silicon nitride (SiNx) and silicon oxide (SiOx). The third insulating layer 370 may be formed to cover the upper surface and the side surface of the roof layer 360. The third insulating layer 370 serves to protect the roof layer 360 which is made, for example, of an organic material and the third insulating layer 370 may be omitted if necessary.

An encapsulation layer 390 may be formed on the third insulating layer 370. The encapsulation layer 390 is formed to cover the first injection hole 307 and the second injection hole 309 which expose a part of the microcavity 305 to the outside. That is, the encapsulation layer 390 may seal the microcavity 305 so that the liquid crystal molecules 310 formed in the microcavity 305 are not discharged to the outside of the microcavity 305. Because the encapsulation layer 390 contacts the liquid crystal molecules 310, the encapsulation layer 390 may be made, for example, of a material which does not react with the liquid crystal molecules 310. For example, the encapsulation layer 390 may be made of parylene and the like.

The encapsulation layer 390 may be formed by a multi-layer such as a double layer and a triple layer. The double layer is configured by two layers made of different materials. The triple layer is configured by three layers, and materials of adjacent layers are different from each other. For example, the encapsulation layer 390 may include a layer made of an organic insulating material and a layer made of an inorganic insulating material.

Although not illustrated, polarizers may be further formed on the upper and lower surfaces of the display device. The polarizers may be configured by a first polarizer and a second polarizer. The first polarizer may be attached onto the lower surface of the substrate 110, and the second polarizer may be attached onto the encapsulation layer 390.

Next, a manufacturing method of a display device according to an example embodiment will be described below with reference to FIGS. 7 to 18. Further, the manufacturing method will be described with reference to FIGS. 1 to 6 together.

FIGS. 7 to 18 are process cross-sectional views illustrating a manufacturing method of a display device according to an example embodiment. FIGS. 7, 9, 11, 13, 15, and 17 are cross-sectional views illustrated along the same line. Further, FIGS. 8, 10, 12, 14, 16, and 18 are cross-sectional views illustrated along the same line.

First, as illustrated in FIGS. 1 to 8, the pixels PX are formed on a substrate 110 made of glass or plastic. The pixels PX include (FIG. 3) a gate line 121 and a step-down gate line 123 extending in one direction are formed, and a first gate electrode 124h, a second gate electrode 124l, and a third gate electrode 124c which protrude from the gate line 121 are formed.

Further, a storage electrode line 131 may be formed together so as to be spaced apart from the gate line 121, the step-down gate line 123, and the first to third gate electrodes 124h, 124l, and 124c.

A gate insulating layer 140 is formed on the entire surface of the substrate 110 including the gate line 121, the step-down gate line 123, the first to third gate electrodes 124h, 124l, and 124c, and the storage electrode line 131 by using, for example, an inorganic insulating material such as silicon oxide (SiOx) or silicon nitride (SiNx). The gate insulating layer 140 may be formed by a single layer or may include multiple layers.

A first semiconductor 154h, a second semiconductor 154l, and a third semiconductor 154c are formed by depositing a semiconductor material such as amorphous silicon, polycrystalline silicon, and metal oxide on the gate insulating layer 140 and then patterning the deposited semiconductor material. The first semiconductor 154h may be positioned on the first gate electrode 124h, the second semiconductor 154l may be positioned on the second gate electrode 124l, and the third semiconductor 154c may be positioned on the third gate electrode 124c.

A data line 171 extending in a direction so as to cross gate line 121 is formed by depositing a metal material and then patterning the deposited metal material. The metal material may be formed by a single layer or may include multiple layers.

Further, a first source electrode 173h protruding from the data line 171 above the first gate electrode 124h and a first drain electrode 175h spaced apart from the first source electrode 173h are formed together. Further, a second source electrode 173l connected with the first source electrode 173h and a second drain electrode 175l spaced apart from the second source electrode 173l are formed together. Further, a third source electrode 173c extended from the second drain electrode 175l and a third drain electrode 175c spaced apart from the third source electrode 173c are formed together.

The first to third semiconductors 154h, 154l, and 154c, the data line 171, the first to third source electrodes 173h, 173l, and 173c, and the first to third drain electrodes 175h, 175l, and 175c may be formed by sequentially depositing a semiconductor material and a metal material and then patterning the semiconductor material and the metal material at the same time. In this case, the first semiconductor 154h may be extended to the lower portion of the data line 171.

The first, second, and third gate electrodes 124h, 124l, and 124c, the first, second, and third source electrodes 173h, 173l, and 173c, and the first, second, and third drain electrodes 175h, 175l, and 175c configure, respectively, the first, second, and third thin film transistors (TFTs) Qh, Ql, and Qc together with the first, second, and third semiconductors 154h, 154l, and 154c, respectively.

A passivation layer 180 is formed on the data line 171, the first to third source electrodes 173h, 173l, and 173c, the first to third drain electrodes 175h, 175l, and 175c, and the semiconductors 154h, 154l, and 154c exposed between the respective source electrodes 173h, 173l, and 173c and the respective drain electrodes 175h, 175l, and 175c. The passivation layer 180 may be made, for example, of an organic insulating material or an inorganic insulating material, and may be formed in a single layer or may include multiple layers.

A color filter 230 is formed in each pixel area PX on the passivation layer 180. However, the color filter 230 may not be formed in the pixel area PX which is positioned at a side edge of each pixel column. Color filters 230 having the same color may be formed in a column direction of the plurality of pixel areas PX. In the case of forming the color filters 230 having three colors, a first colored color filter 230 may be first formed, and then a second colored color filter 230 may be formed by shifting a mask. Next, the second colored color filter 230 may be formed and then a third colored color filter may be formed by shifting a mask.

A light blocking member 220 is formed on a boundary of each pixel area PX on the passivation layer 180 and the thin film transistor. The light blocking member 220 may also be formed in the pixel areas PX that are positioned at the side edge of each pixel column.

Hereinabove, the light blocking member 220 is formed after forming the color filters 230, but the present disclosure is not limited thereto, and the light blocking member 220 may be first formed and then the color filters 230 may be formed.

A first insulating layer 240 made, for example, of an inorganic insulating material such as silicon nitride (SiNx) and silicon oxide (SiOx) is formed on the color filter 230 and the light blocking member 220.

A first contact hole 185h is formed by etching the passivation layer 180, the light blocking member 220, and the first insulating layer 240 so as to expose a part of the first drain electrode 175h, and a second contact hole 185l is formed so as to expose a part of the second drain electrode 175l.

A first subpixel electrode 191h is formed in the first subpixel area PXa, and a second subpixel electrode 191l is formed in the second subpixel area PXb, by depositing and patterning a transparent metal material such as, for example, indium tin oxide (ITO) and indium zinc oxide (IZO) on the first insulating layer 240. The first subpixel electrode 191h and the second subpixel electrode 191l are separated from each other with the first valley V1 therebetween. The first subpixel electrode 191h is connected with the first drain electrode 175h through the first contact hole 185h, and the second subpixel electrode 191l is connected with the second drain electrode 175l through the second contact hole 185l.

Horizontal stems 193h and 193l, and vertical stems 192h and 192l crossing the horizontal stems 193h and 193l are formed in the first subpixel electrode 191h and the second subpixel electrode 191l, respectively. Further, a plurality of minute branches 194h and 194l, which obliquely extends from the horizontal stems 193h and 193l and the vertical stems 192h and 192l, are formed.

Figure 9:
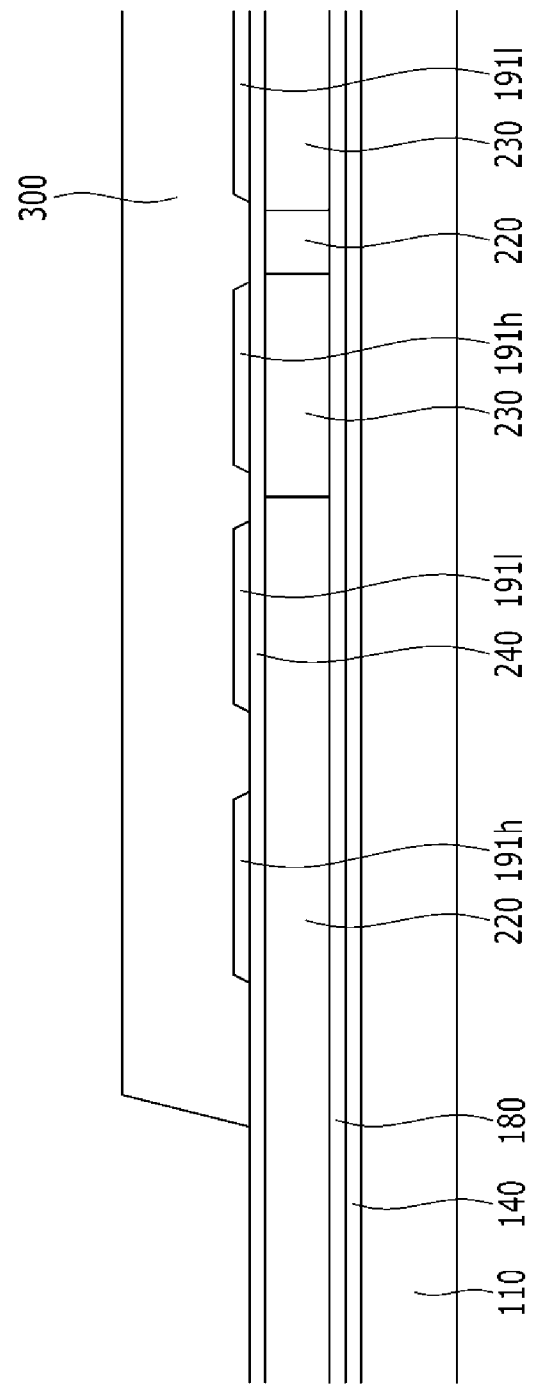
Figure 10:
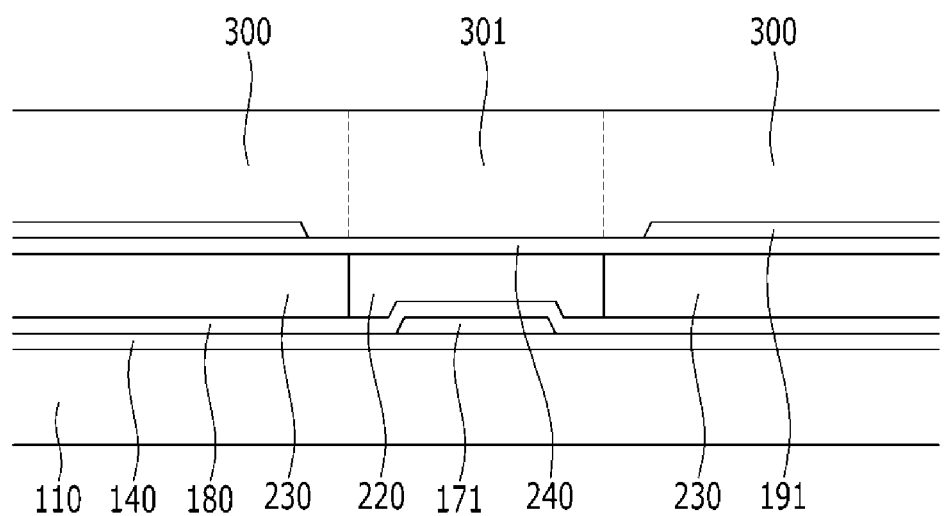

As illustrated in FIGS. 9 and 10, a sacrificial layer 300 is formed by coating a photosensitive organic material on the pixel electrode 191 and performing a photolithography process.

The sacrificial layers 300 are formed so as to be connected to each other along the plurality of pixel columns. The sacrificial layers 300 are formed in each pixel area PX and first valley V1. Patterning is performed so that the sacrificial layer 300 is not formed at the edge surrounding the plurality of pixel areas PX.

Further, when the sacrificial layers 300 are formed, a connection bridge 301 connecting the sacrificial layers 300 positioned in different pixel columns is also formed with the sacrificial layer 300. The connection bridge 301 is formed at the second valley V2, and a plurality of connection bridges 301 are formed at predetermined distances. The connection bridge 301 is formed of the same material as the sacrificial layer 300 in the same process.

Figure 11:
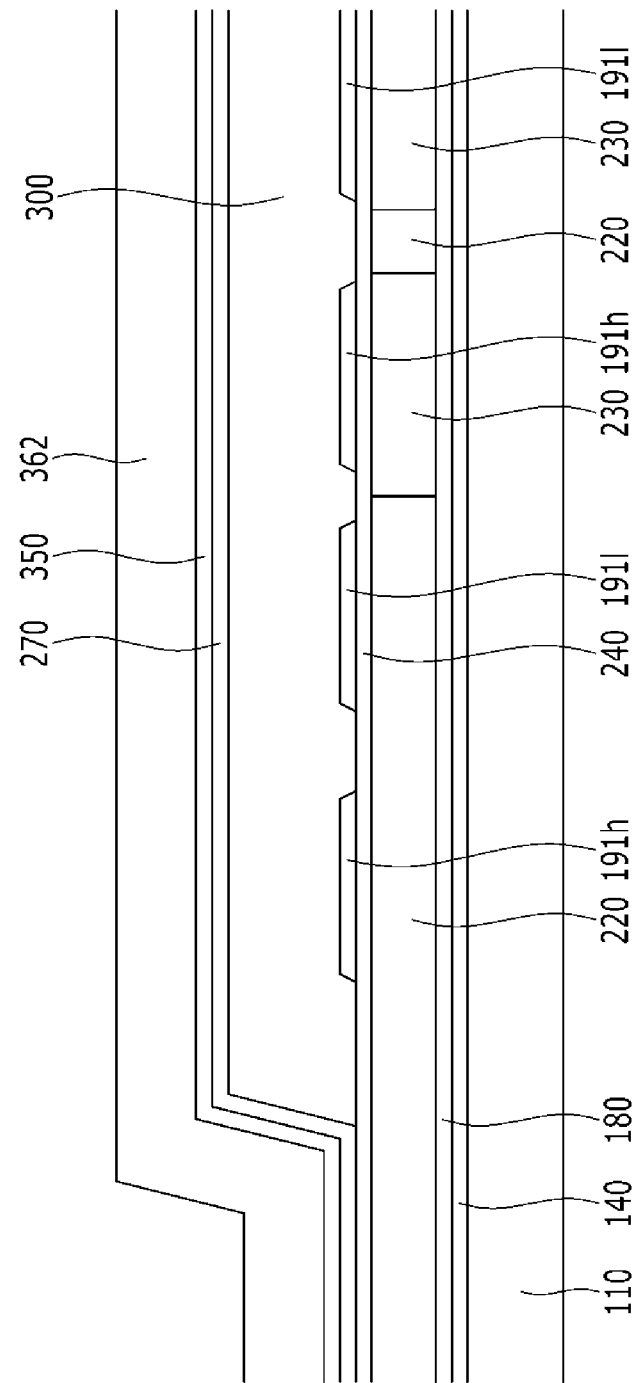
Figure 12:
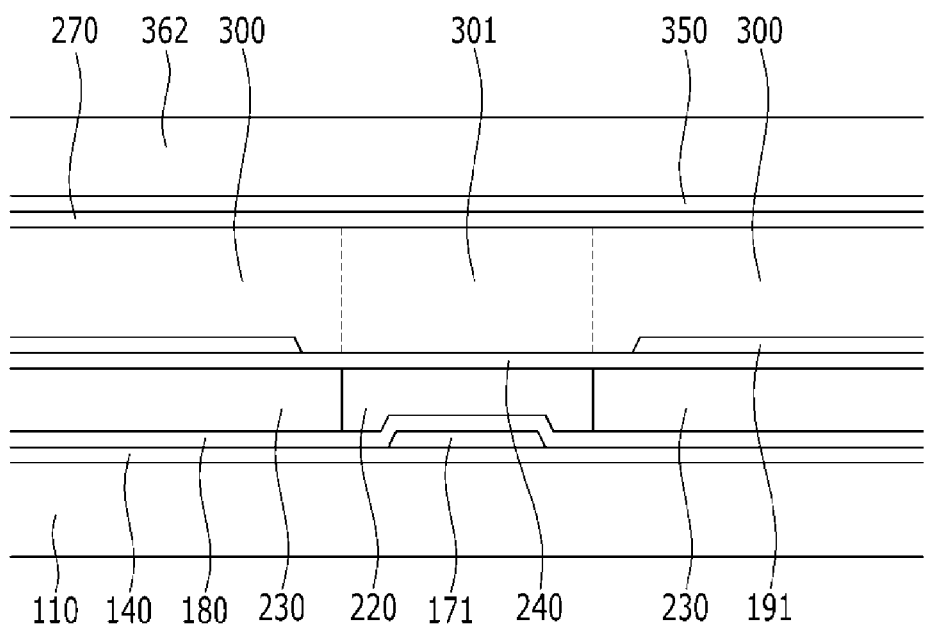

As illustrated in FIGS. 11 and 12, a common electrode 270 is formed by depositing a transparent metal material such as indium tin oxide (ITO) and indium zinc oxide (IZO) on the sacrificial layer 300.

Next, a second insulating layer 350 may be formed on the common electrode 270 by using, for example, an inorganic insulating material such as silicon oxide and silicon nitride.

Next, a roof layer 360 is formed of, for example, an organic material on the second insulating layer 350.

Figure 13:
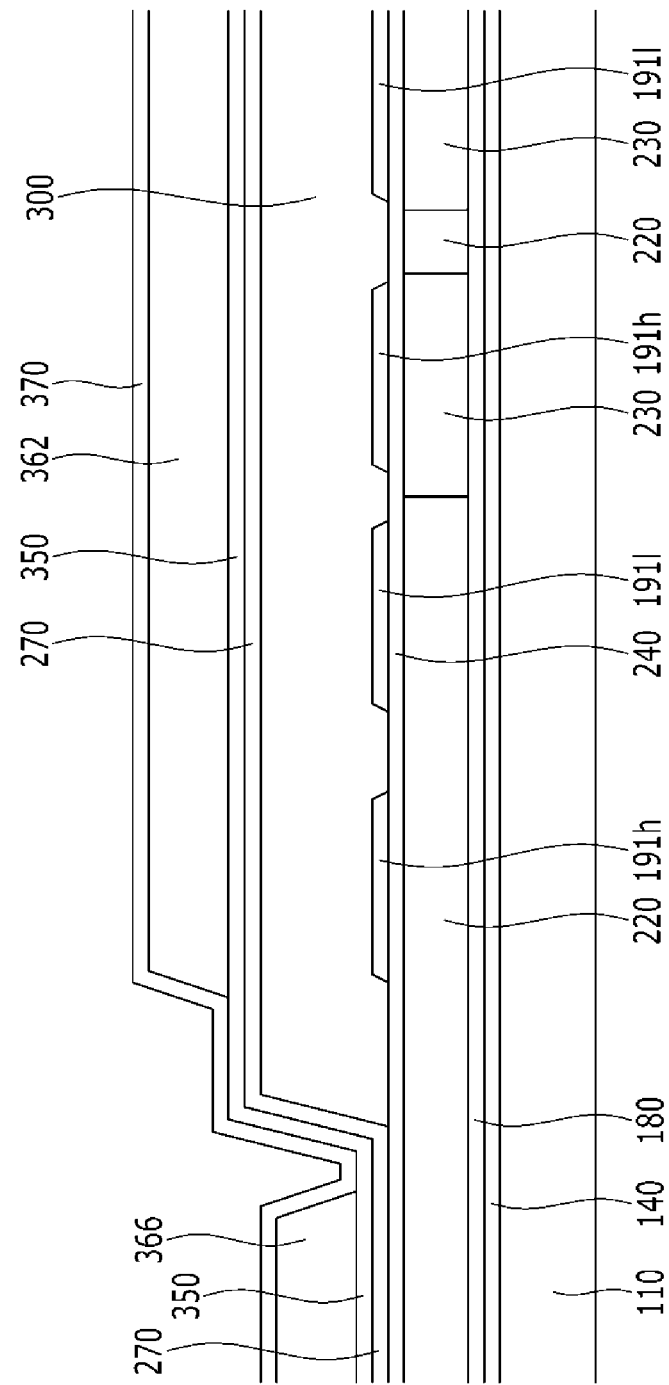
Figure 14:
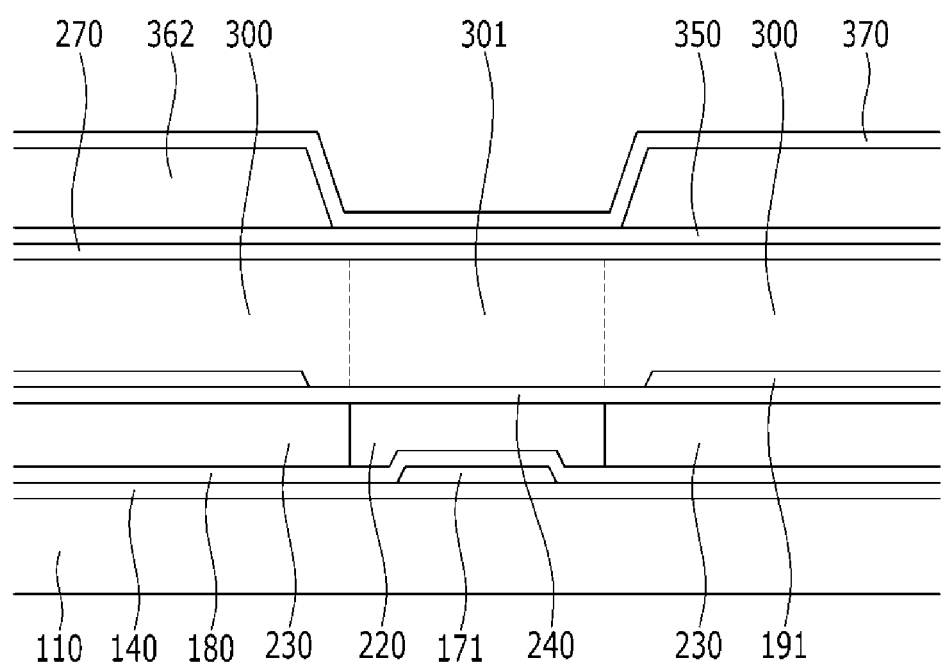

As illustrated in FIGS. 13 and 14, a portion of the roof layer 360 positioned at a side edge of each pixel column is removed by patterning the roof layer 360, leaving upper part 362 on one side and outer part 366 at the other side of the removed portion. The outer part 366, which is the portion of the roof layer 360 positioned at the edge surrounding the whole pixel areas PX, is left. The portion of the roof layer 360 corresponding to a portion where the sacrificial layer 300 is not formed is left.

Further, the portion of the roof layer 360 positioned on the connection bridge 301 (FIG. 14) is also removed.

A third insulating layer 370 may be formed on the roof layer 360, for example, with an inorganic insulating material such as silicon nitride (SiNx) and silicon oxide (SiOx). The third insulating layer 370 is formed on the patterned roof layer 360 to cover and protect the side surface of the roof layer 360.

Figure 15:
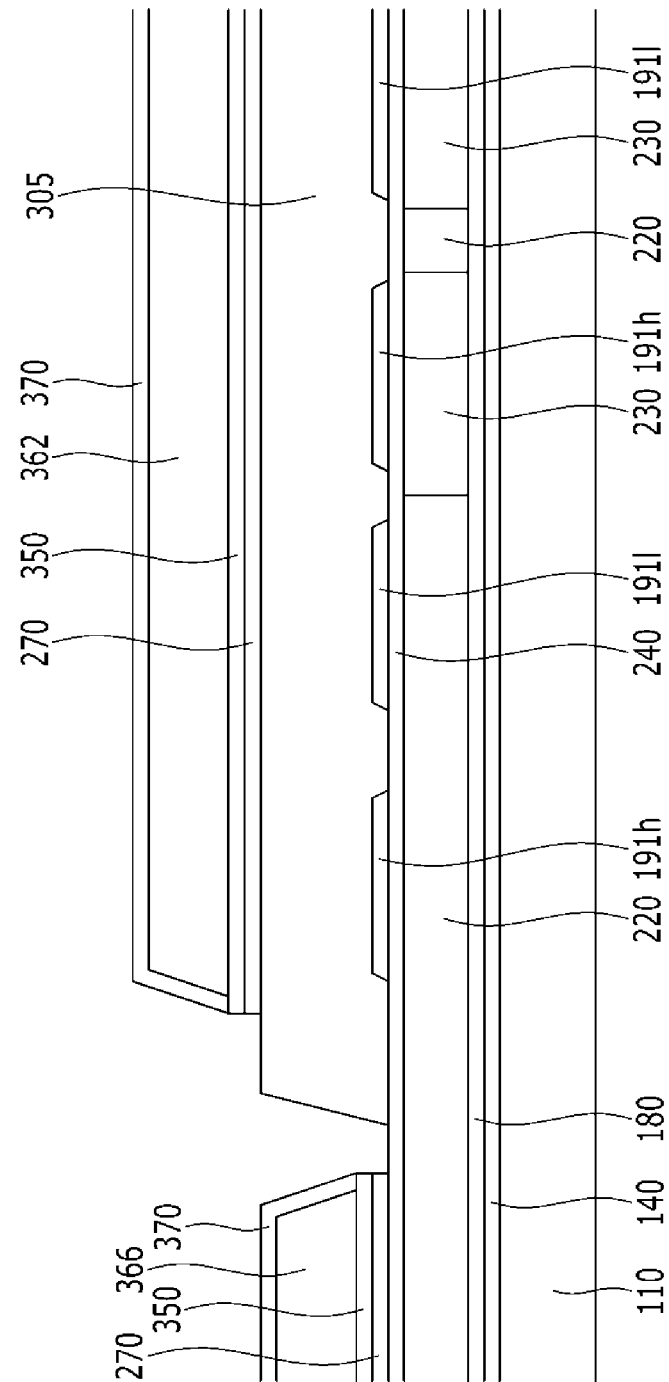
Figure 16:
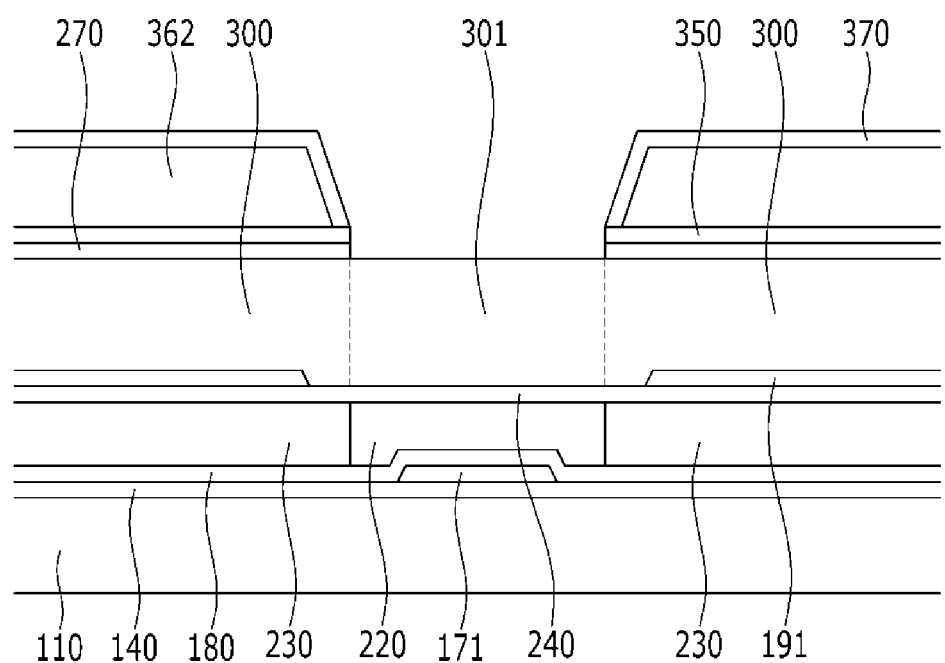

As illustrated in FIGS. 15 and 16, portions of the third insulating layer 370, the second insulating layer 350, and the common electrode 270 positioned at a side edge of each pixel column are removed by patterning the third insulating layer 370, the second insulating layer 350, and the common electrode 270. Further, portions of the third insulating layer 370, the second insulating layer 350, and the common electrode 270 positioned on the connection bridge 301 are also removed together. That is, the portions of the third insulating layer 370, the second insulating layer 350, and the common electrode 270 positioned below the roof layer 360 are left, and the remaining portions are removed.

The sacrificial layer 300 positioned below the portion where the common electrode 270 is removed is exposed by patterning the common electrode 270.

Figure 17:
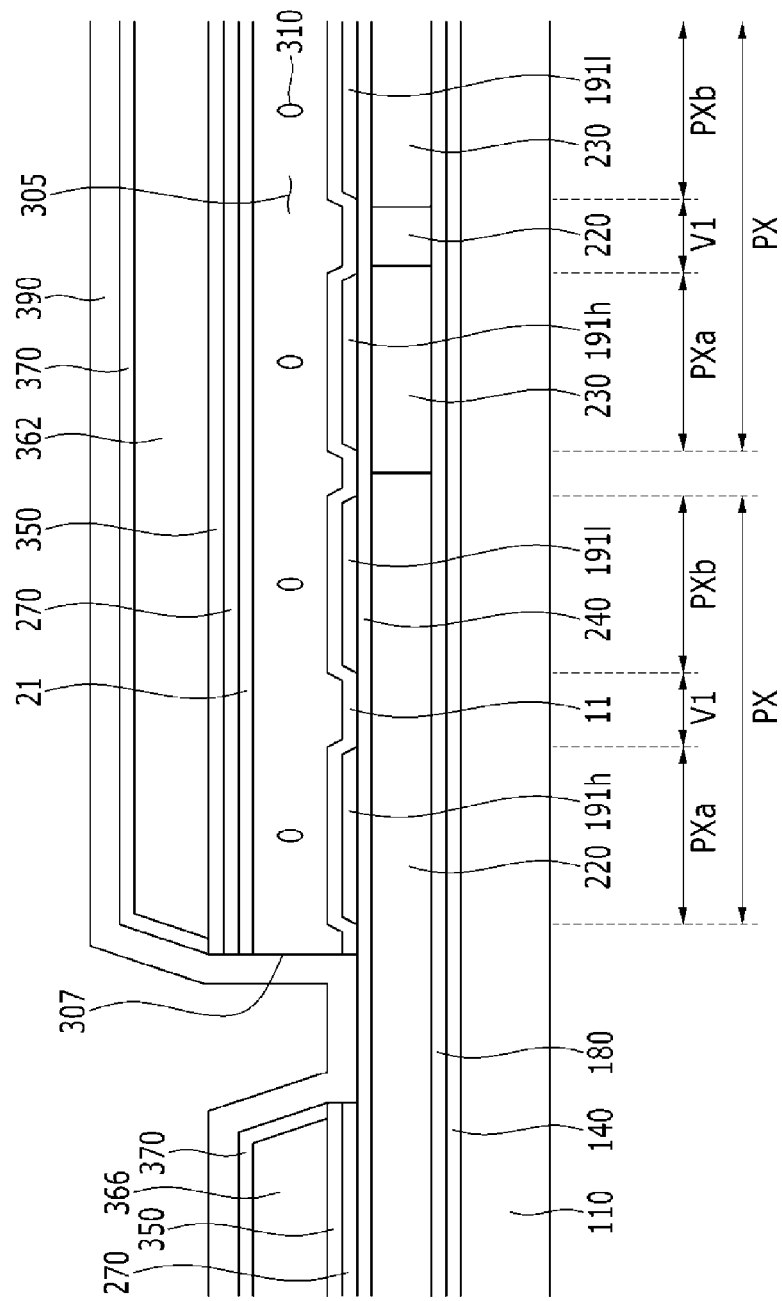
Figure 18:
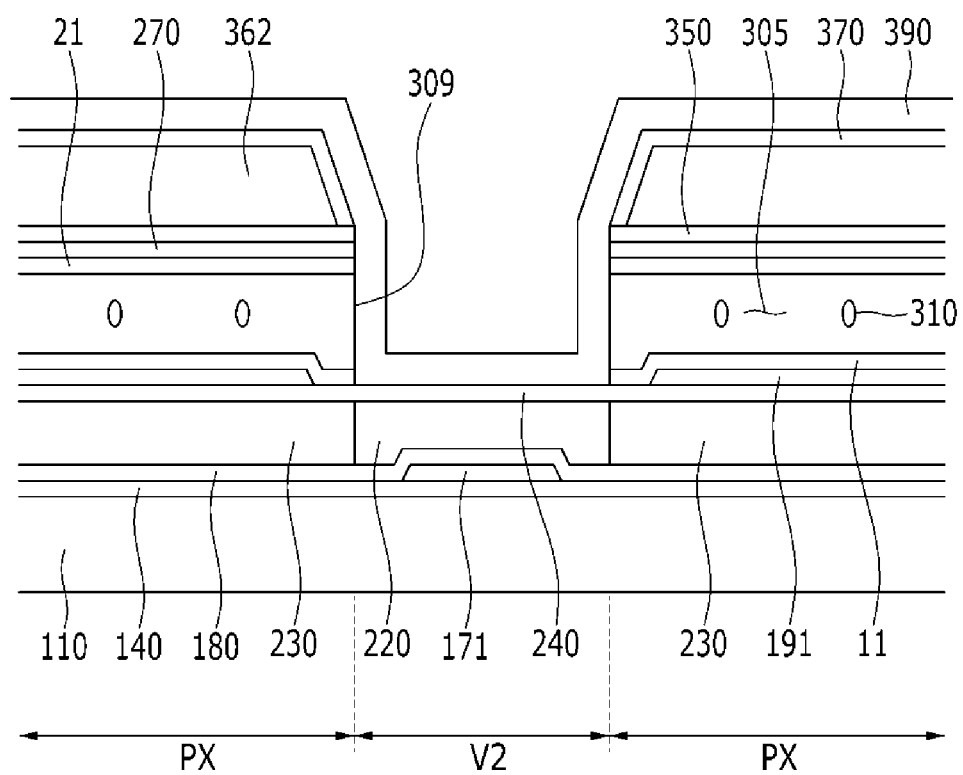

As illustrated in FIGS. 17 and 18, the sacrificial layer 300 is fully removed by supplying a developer on the substrate 110 where the sacrificial layer 300 is exposed, or by using an ashing process.

When the sacrificial layer 300 is removed, the microcavity 305 is generated at the site where the sacrificial layer 300 was positioned before removal.

The pixel electrode 191 and the common electrode 270 are spaced apart from each other with the microcavity 305 therebetween, and the pixel electrode 191 and the roof layer 360 are spaced apart from each other with the microcavity 305 therebetween. The roof layer 360 includes an upper part 362 covering an upper surface of the microcavity 305, a side wall part 364 covering a side surface of the microcavity 305, and an outer part 366 formed at the edge of the substrate 110. Because the upper surface and both side surfaces of the microcavity 305 are covered by the roof layer 360, the microcavity 305 has a tunnel shape, which penetrates along the pixel column.

The microcavity 305 is exposed to have an opening through the portions where the roof layer 360 and the common electrode 270 are removed, which are injection holes 307 and 309. The first injection hole 307 is formed at a side edge of the pixel column, and the second injection hole 309 is formed between the adjacent pixel columns.

The first injection hole 307 may be further formed at an opposite edge of the pixel column. That is, the first injection holes 307 may be formed at both side edges of each of the pixel columns.

The roof layer 360 is cured by heating the substrate 110. This is to maintain the shape of the microcavity 305 by the roof layer 360. The upper parts 362 of the roof layer 360 are connected to each other along each pixel column and supported by the side wall part 364. As a result, it is possible to prevent the roof layer 360 from being deformed while performing the curing process.

An aligning agent containing an alignment material is dropped on the substrate 110, for example, by a slit coating method or an inkjet method, and thus the aligning agent is introduced into the microcavity 305 through the first injection hole 307 and the second injection hole 309. Further, the aligning agent may be injected into the microcavity 305 by using capillary force by supplying the aligning agent to the first injection hole 307.

When the aligning agent is injected into the microcavity 305 and then the curing process is performed, a solution component evaporates and the alignment material remains on an inner wall of the microcavity 305.

Accordingly, the first alignment layer 11 may be formed on the pixel electrode 191, and the second alignment layer 21 may be formed below the common electrode 270. The first alignment layer 11 and the second alignment layer 21 face each other with the microcavity 305 therebetween, and are connected to each other at the edge of the pixel area PX.

In this case, the first and second alignment layers 11 and 21 may be aligned in a vertical direction with respect to the substrate 110, except for the side surface of the microcavity 305. In addition, a process of irradiating UV light to the first and second alignment layers 11 and 21 is performed, and as a result, the first and second alignment layers 11 and 21 may be aligned in a horizontal direction to the substrate 110.

The liquid crystal material constituted by liquid crystal molecules 310 are dropped on the substrate 110 by an inkjet method or a dispensing method, and thus the liquid crystal material is introduced into the microcavity 305 through the first injection hole 307 and the second injection hole 309. Further, the liquid crystal material may be injected into the microcavity 305 by using capillary force by supplying the liquid crystal material to the first injection hole 307.

When the liquid crystal material is injected into the microcavity 305 by supplying the liquid crystal material to the first injection hole 307, the liquid crystal material is supplied to only the edge of the substrate 110. Accordingly, it is possible to prevent the upper surface of the roof layer 360 from becoming contaminated by the liquid crystal material. The portion of the roof layer 360 positioned in the pixel area PX positioned at the edge of each pixel column may be contaminated, but as described above, because the light blocking member 220 is formed in the pixel area PX positioned at the edge of each pixel column, it is possible to prevent the contamination from being recognized.

An encapsulation layer 390 is formed by depositing on the third insulating layer 370 a material which does not react with the liquid crystal molecules 310. The encapsulation layer 390 is formed to cover the first injection hole 307 and the second injection hole 309 to seal the microcavity 305.

Next, although not illustrated, polarizers may be further attached onto the upper and lower surfaces of the display device. The polarizers may be configured by a first polarizer and a second polarizer. The first polarizer may be attached onto the lower surface of the substrate 110, and the second polarizer may be attached onto the encapsulation layer 390.

Next, a display device according to an example embodiment will be described below with reference to FIG. 19.

Figure 19:
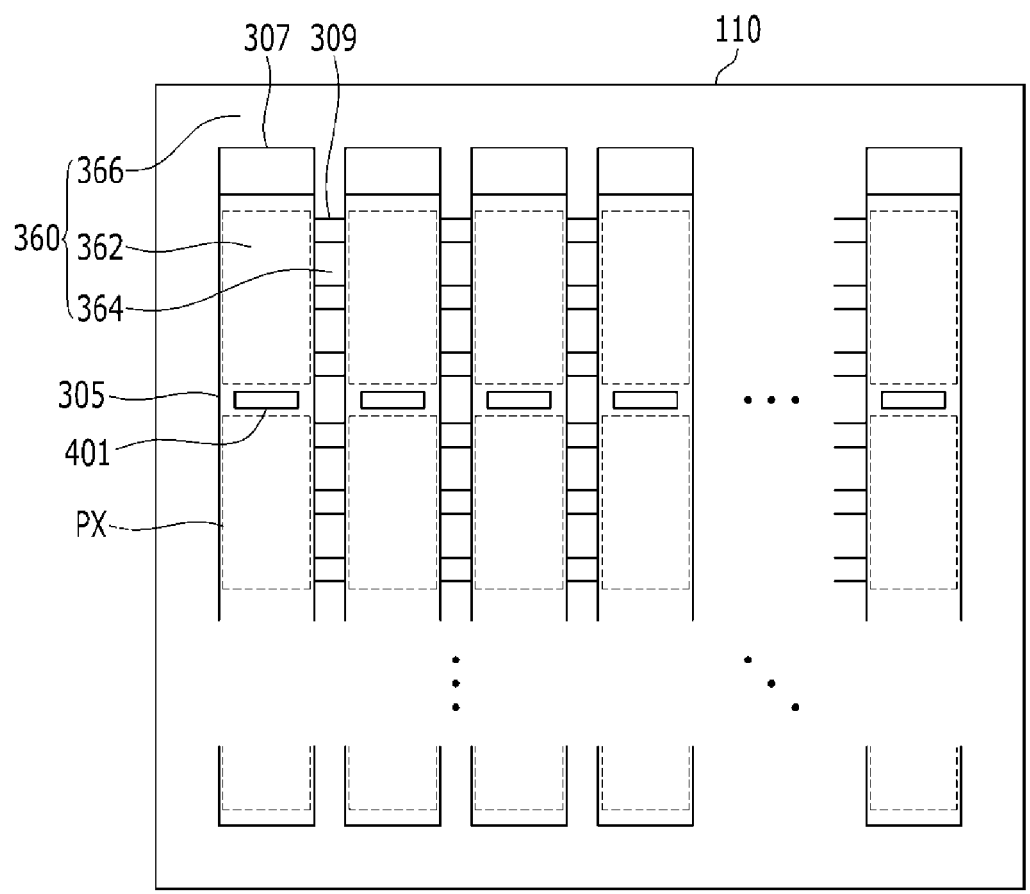
FIG. 19 is a plan view illustrating a display device according to an example embodiment.

Because the display device according to an example embodiment illustrated in FIG. 19 is almost the same as that illustrated in FIGS. 1 to 6, repetitive description thereof is omitted and only different parts will be described below. The largest difference from the above example embodiment is that an opening is further formed at the upper part of the roof layer, and hereinafter, the difference will be described in more detail.

FIG. 19 is a plan view illustrating a display device according to an exemplary embodiment of the present invention.

In the display device according to an example embodiment, a thin film transistor and a pixel electrode 191 connected to the thin film transistor are formed on a substrate 110. A roof layer 360 is formed on the pixel electrode 191 so as to be spaced apart from each other with a microcavity 305 therebetween. The microcavity 305 has a tunnel shape, which penetrates along a pixel column, and a first injection hole 307 is formed in the roof layer 360 so as to expose the microcavity 305 at a side edge of each pixel column. A liquid crystal layer constituted by liquid crystal molecules 310 is formed in the microcavity 305, and an encapsulation layer 390 is formed on the roof layer 360 so as to cover the first injection hole 307 to seal the microcavity 305.

The roof layer 360 includes an upper part 362 covering an upper surface of the microcavity 305, and a side wall part 364 covering a side surface of the microcavity 305.

An opening 401 is formed at the upper part 362 of the roof layer 360 so as to expose the microcavity 305. The opening 401 may be positioned between the vertically adjacent pixel areas PX. Further, although not illustrated, the opening 401 may be positioned on the thin film transistor.

The microcavity 305 is elongated along the pixel column, and the liquid crystal molecules 310 are injected to the first injection hole 307 to move from one side edge of the pixel column to the other side edge. During the liquid crystal injection process, air bubbles may be generated, and the opening 401 may serve to discharge the air bubble to the outside of the microcavity 305.

The opening 401 may be formed in a rectangle including a long side formed in a parallel direction with a pixel row. However, the shape of the opening 401 is not limited thereto, and may be a triangle, a circle, an oval, and the like.

Next, a display device according to an example embodiment will be described below with reference to FIG. 20.

Figure 20:
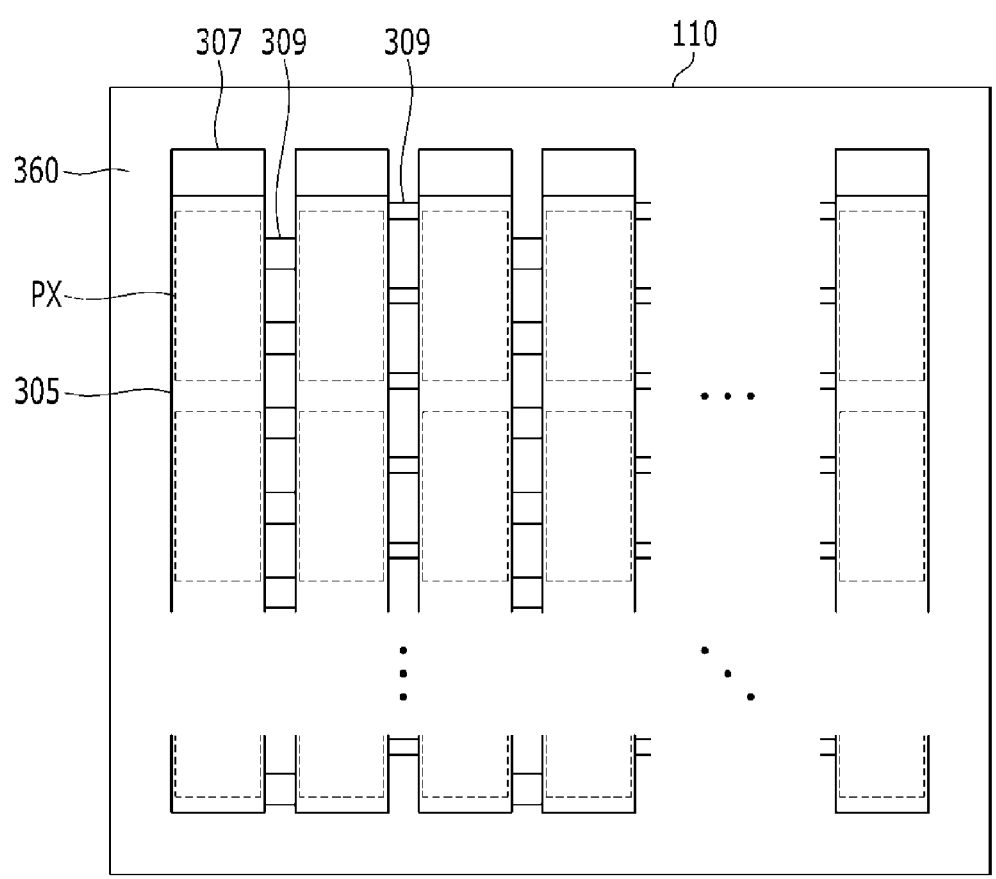
FIG. 20 is a plan view illustrating a display device according to an example embodiment.

Because the display device according to an example embodiment illustrated in FIG. 20 is almost the same as that illustrated in FIGS. 1 to 6, repetitive description thereof is omitted and only different parts will be described below. The largest difference from the above example embodiment is that a second injection hole is asymmetrically formed, and hereinafter, the difference will be described in more detail.

FIG. 20 is a plan view illustrating a display device according to an example embodiment.

The second injection hole 309 is formed in the roof layer 360 so as to expose the microcavity 305 between the adjacent pixel columns. The second injection holes 309 may be formed at both sides of the pixel column.

In the above example embodiment, the second injection holes 309 formed at both sides of the pixel column are symmetrically formed, while in the example embodiment illustrated in FIG. 20, the second injection holes 309 formed at both sides of the pixel column are asymmetrically formed.

For example, the second injection hole 309 positioned at a left side of the second pixel column may be larger than the second injection hole 309 positioned at a right side of the second pixel column. Further, the second injection hole 309 positioned at the left side of the second pixel column and the second injection hole 309 positioned at the right side of the second pixel column may not be formed on the same line, but be disposed in zigzags.

Although not illustrated, shapes of the second injection hole 309 positioned at the left side of the second pixel column and the second injection hole 309 positioned at the right side of the second pixel column may be differently formed.

That is, the second injection hole 309 positioned at the left side of each pixel column may be different from the second injection hole 309 positioned at the right side of each pixel column in shape or size or both. Further, the formation position of the second injection hole 309 positioned at the left side of each pixel column may be asymmetrical to the formation position of the second injection hole 309 positioned at the right side of each pixel column.

Next, a display device according to an example embodiment will be described below with reference to FIGS. 21 and 22.

Figure 21:
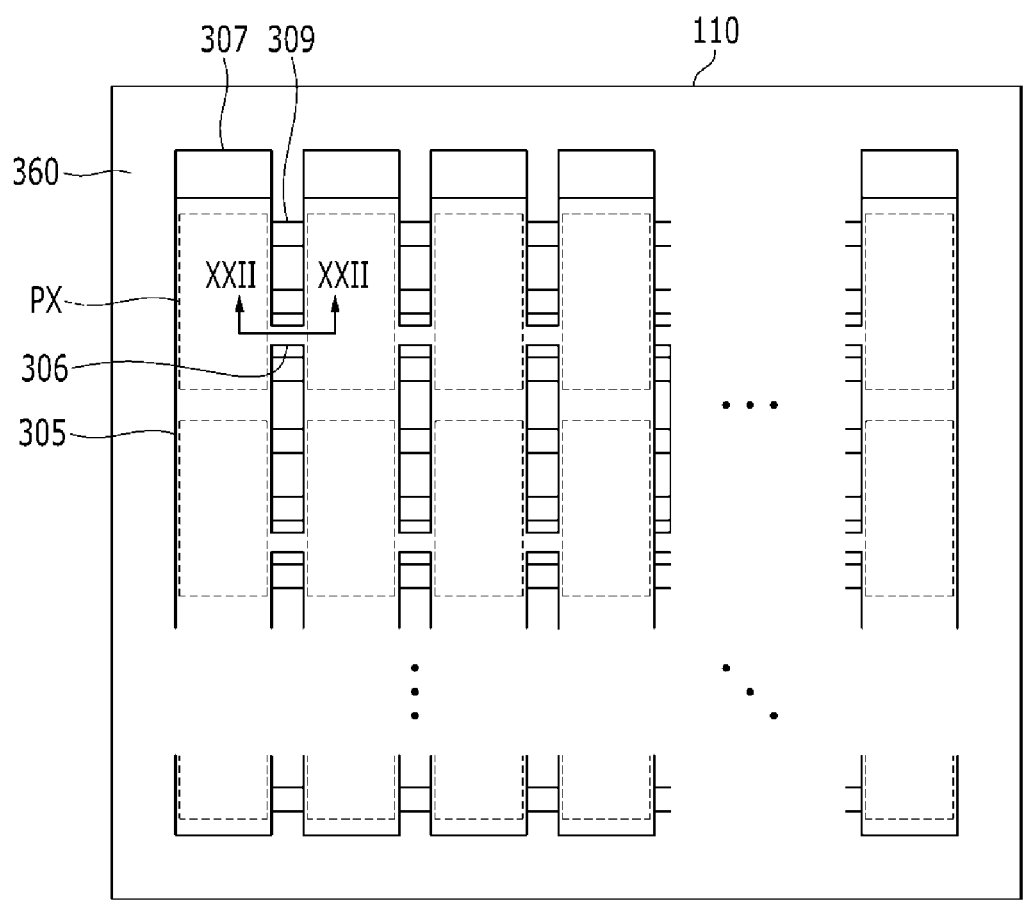
FIG. 21 is a plan view illustrating a display device according to an example embodiment.
Figure 22:
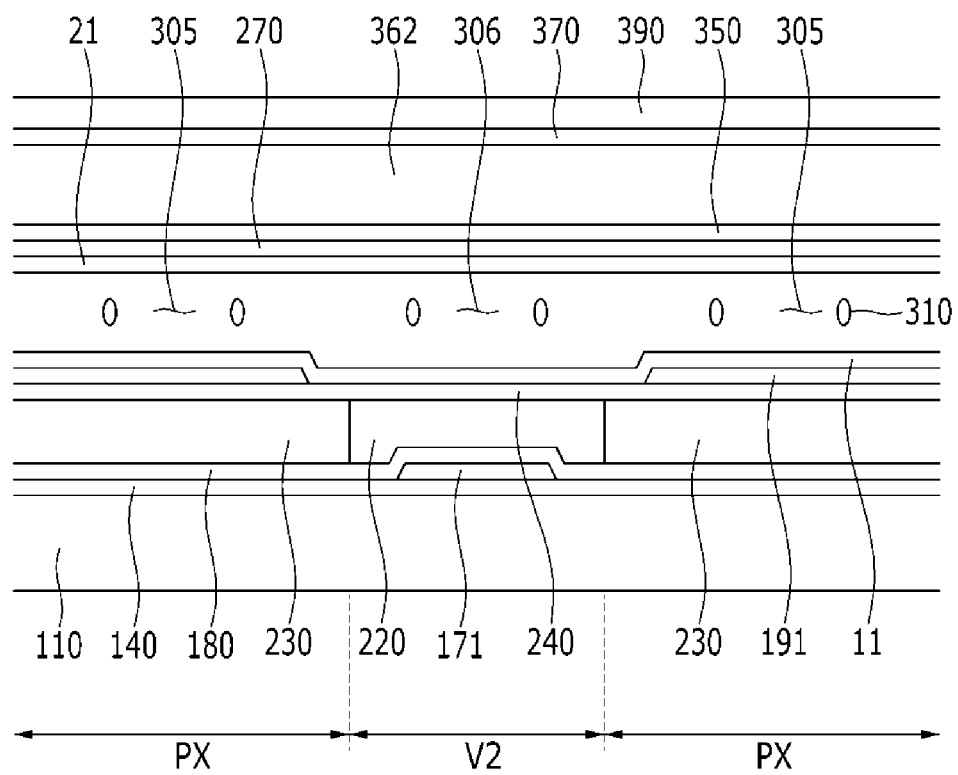
FIG. 22 is a cross-sectional view illustrating a part of the display device taken along line XXII-XXII of FIG. 21 according to an example embodiment.

Because the display device according to an example embodiment illustrated in FIGS. 21 and 22 is almost the same as that illustrated in FIGS. 1 to 6, repetitive description thereof is omitted, and only different parts will be described below. The largest difference from the above example embodiment is that microcavities positioned in different pixel columns are connected to each other, and hereinafter, the difference will be described in more detail.

FIG. 21 is a plan view illustrating a display device according to an example embodiment, and FIG. 22 is a cross-sectional view illustrating a part of the display device taken along line XXII-XXII of FIG. 21.

In the above example embodiment, because the upper surface and both side surfaces of the microcavity 305 are surrounded by the roof layer 360, the microcavities 305 positioned in different pixel columns are independent from each other, while in the example embodiment illustrated in FIGS. 21 and 22, the microcavities 305 positioned in different pixel columns are connected to each other.

The display device according to the example embodiment illustrated in FIGS. 21 and 22 further includes a passage 306 formed to pass through the side wall part 364 of the roof layer 360 so that the microcavities 305 positioned in different pixel columns are connected to each other.

The microcavity 305 is filled by the liquid crystal molecules 310. In this case, the liquid crystal is not smoothly injected into the microcavities 305 positioned in some pixel columns and thus a portion which is not filled by the liquid crystal molecules 310 well may occur. In this case, the liquid crystal molecules 310 filling the microcavities 305 positioned in the adjacent pixel columns move through the passage 306 and thus the portion which is not filled by the liquid crystal molecules 310 well may be compensated.

Next, a display device according to an example embodiment will be described below with reference to FIG. 23.

Figure 23:
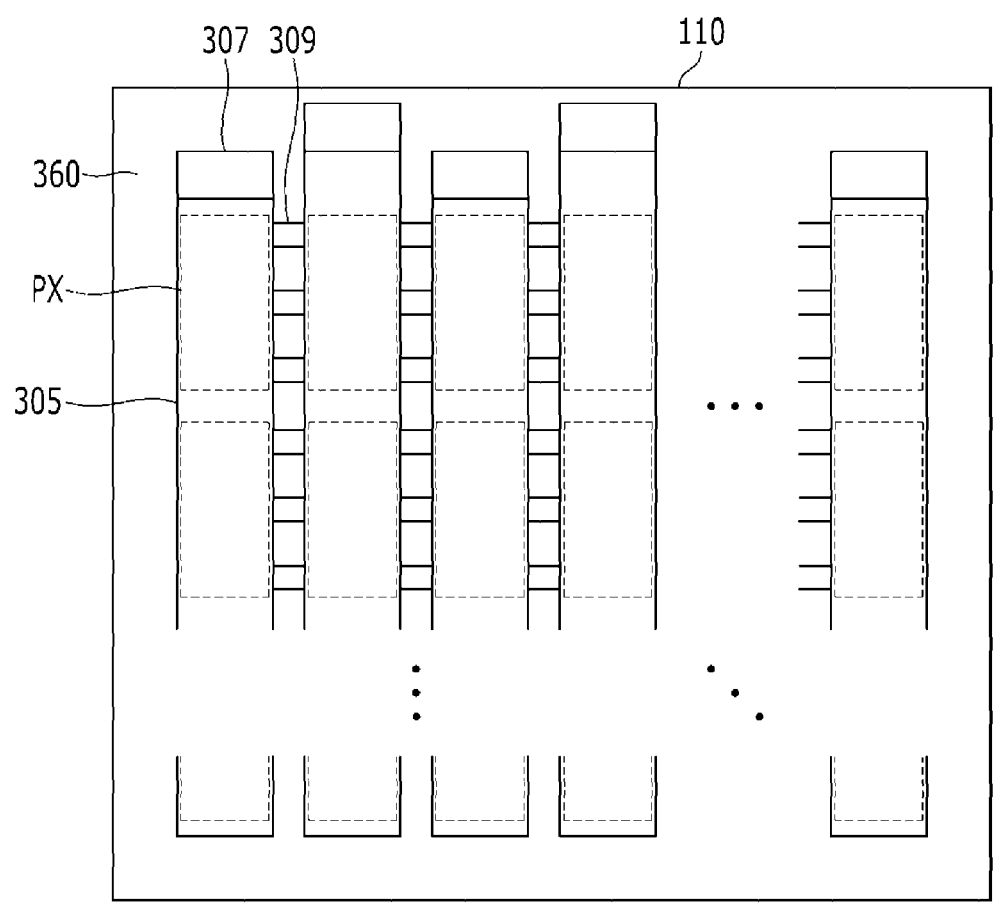
FIG. 23 is a plan view illustrating a display device according to an example embodiment.

Because the display device according to an example embodiment illustrated in FIG. 23 is almost the same as that illustrated in FIGS. 1 to 6, repetitive description thereof is omitted and only different parts will be described below. The largest difference from the above example embodiment is that lengths of the sides of the microcavities positioned in different pixel columns are different from each other, and hereinafter, the difference will be described in more detail.

FIG. 23 is a plan view illustrating a display device according to an example embodiment.

The shape on a plane of the microcavity may be a rectangle formed by two short sides and two long sides.

In the above example embodiment, lengths of long sides and short sides of the microcavities positioned in all the pixel columns are equally formed, while in the example embodiment illustrated in FIG. 23, lengths of the long sides of the microcavities positioned in the different pixel columns are different from each other.

For example, lengths of long sides of microcavities positioned in even numbered pixel columns may be larger than those of long sides of microcavities positioned in odd numbered pixel columns. Alternatively, lengths of long sides of microcavities positioned in odd numbered pixel columns may be larger than those of long sides of microcavities positioned in even numbered pixel columns.

The lengths of the long sides of the microcavities positioned in the different pixel columns are different from each other, and as a result, positions of the first injection holes 307 formed at the edges of the respective pixel columns are different from each other.

Next, a display device according to an example embodiment will be described below with reference to FIG. 24.

Figure 24:
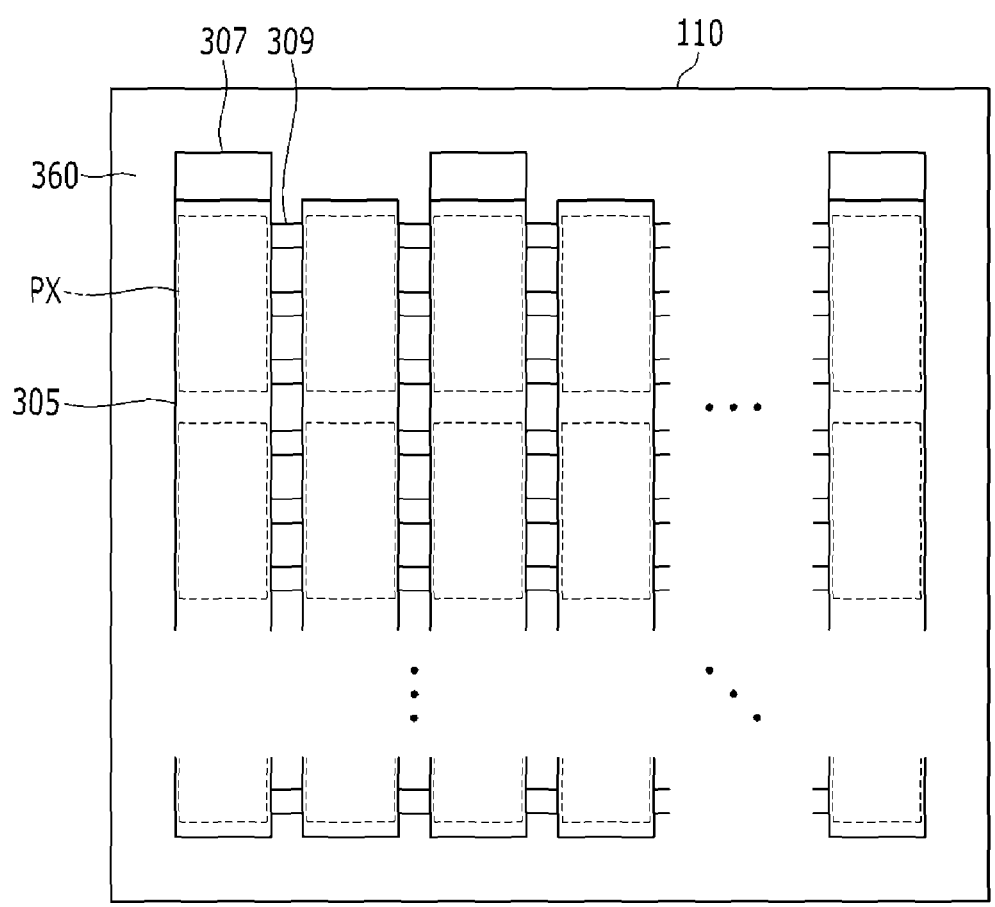
FIG. 24 is a plan view illustrating a display device according to an example embodiment.

Because the display device according to an example embodiment illustrated in FIG. 24 is almost the same as that illustrated in FIGS. 1 to 6, repetitive description thereof is omitted and only different parts will be described below. The largest difference from the above example embodiment is that first injection holes are formed at edges of only some pixel columns, and hereinafter, the difference will be described in more detail.

FIG. 24 is a plan view illustrating a display device according to an example embodiment.

In the above example embodiment, first injection holes 307 are formed at side edges of all the pixel columns, while in the example embodiment illustrated in FIG. 24, the first injection holes 307 are formed at side edges of only some of the pixel columns.

For example, the first injection holes 307 may be formed at side edges of the odd numbered pixel columns. For example, the first injection holes 307 may be formed at one-side edges of the even numbered pixel columns.

That is, the first injection holes 307 are formed at side edges of some pixel columns among the plurality of pixel columns, but are not formed at side edges of the rest of the pixel columns.

When the liquid crystal molecules 310 are injected into the microcavity 305 positioned in the pixel column with the first injection hole 307, the liquid crystal molecules 310 move to the microcavity 305 positioned in the pixel column without the first injection hole 307.

Next, a display device according to an example embodiment will be described below with reference to FIG. 25.

Figure 25:
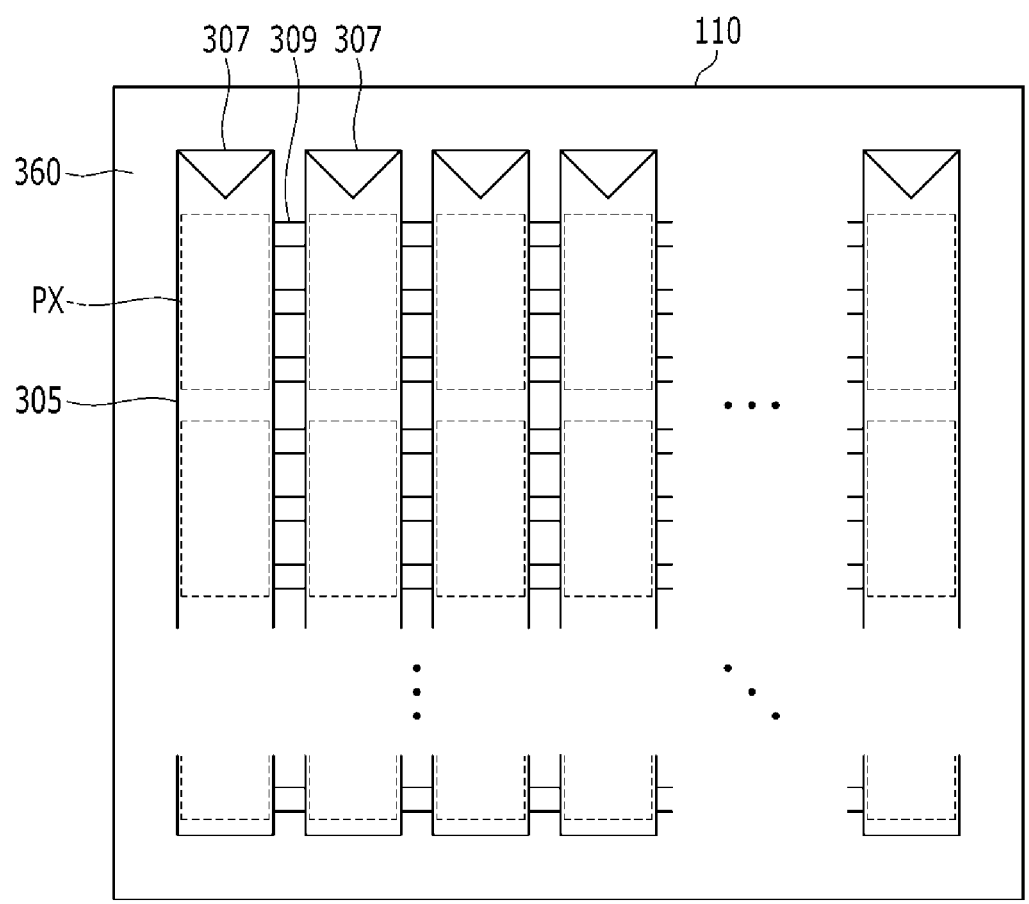
FIG. 25 is a plan view illustrating a display device according to an example embodiment.

Because the display device according to an example embodiment illustrated in FIG. 25 is almost the same as that illustrated in FIGS. 1 to 6, repetitive description thereof is omitted and only different parts will be described below. The largest difference from the above example embodiment is a shape of first injection hole, and hereinafter, the difference will be described in more detail.

FIG. 25 is a plan view illustrating a display device according to an example embodiment.

In the above example embodiment, the shape, in a plan view, of the first injection hole 307 is a quadrangle, while in the example embodiment illustrated in FIG. 25, the shape, in a plan view, of the first injection hole 307 is a reverse triangle.

At the edge of the roof layer 360 contacting the first injection hole 307, a lifting phenomenon or a sagging phenomenon may occur during a curing process of the roof layer 360. In the example embodiment, the deformation of the roof layer 360 may be prevented by changing the shape of the first injection hole 307 to disperse force applied to the edge of the roof layer 360.

The shape, in a plan view, of the first injection hole 307 is not limited thereto and may be variously modified.

Next, a display device according to an example embodiment will be described below with reference to FIG. 26.

Figure 26:
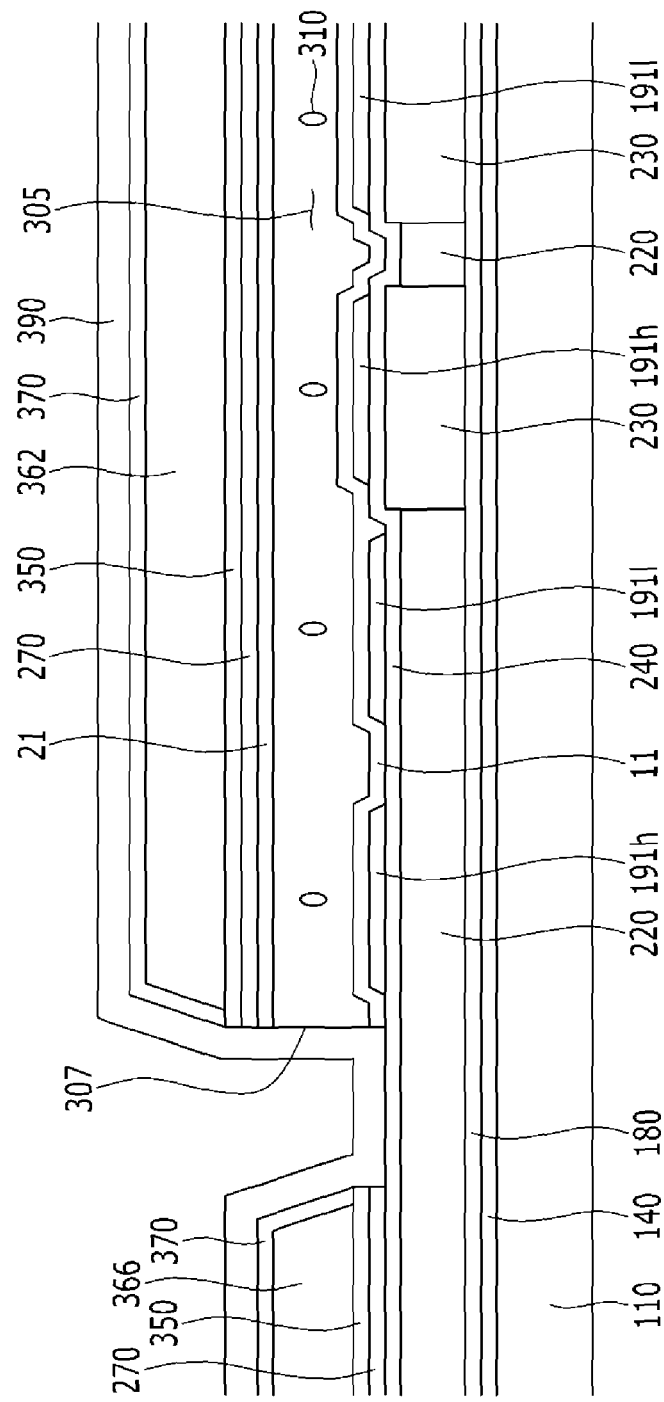
FIG. 26 is a cross-sectional view illustrating a display device according to an example embodiment.

Because the display device according to an example embodiment illustrated in FIG. 26 is almost the same as that illustrated in FIGS. 1 to 6, repetitive description thereof is omitted and only different parts will be described below. The largest difference from the above example embodiment is that heights of a color filter and a light blocking member are different from each other, and hereinafter, the difference will be described in more detail.

FIG. 26 is a cross-sectional view illustrating a display device according to an example embodiment.

In the above example embodiment, heights of the color filter 230 and the light blocking member 220 are the same as each other, while in the example embodiment illustrated in FIG. 26, heights of the color filter 230 and the light blocking member 220 are different from each other.

A height of the color filter 230 may be larger than a height of the light blocking member 220. Accordingly, a cell-gap of the microcavity 305 at a portion with the color filter 230 is smaller than that of the microcavity 305 at a portion with the light blocking member 220. The smaller the cell-gap, the stronger the capillary force, and as a result, the liquid crystal molecules 310 positioned in the microcavity 305 having a large cell-gap may move to the microcavity 305 having a small cell-gap.

The portion with the color filter 230 is an area displaying a screen, and a deficient liquid crystal may be compensated by increasing capillary force of the corresponding portion.

While example embodiments has been described in connection with what is presently considered to be practical example embodiments, it is to be understood that the invention is not limited to the disclosed embodiments, but, on the contrary, is intended to cover various modifications and arrangements included within the spirit and scope of the disclosure, including the appended claims.

| <Description of symbols> | |
|---|---|
| 11: First alignment layer | 21: Second alignment layer |
| 110: Substrate | 121: Gate line |
| 123: Step-down gate line | 124h: First gate electrode |
| 1241: Second gate electrode | 124c: Third gate electrode |
| 131: Storage electrode line | 140: Gate insulating layer |
| 154h: First semiconductor | 1541: Second semiconductor |
| 154c: Third semiconductor | 171: Data line |
| 173h: First source electrode | 1731: Second source electrode |
| 173c: Third source electrode | 175a: First drain electrode |
| 1751: Second drain electrode | 175c: Third drain electrode |
| 180: Passivation layer | 191: Pixel electrode |
| 191h: First subpixel electrode | 1911: Second subpixel electrode |
| 220: Light blocking member | 230: Color filter |
| 240: First insulating layer | 270: Common electrode |
| 300: Sacrificial layer | 301: Connection bridge |
| 305: Microcavity | 306: Passage |
| 307: First injection hole | 309: Second injection hole |
| 310: Liquid crystal molecule | 350: Second insulating layer |
| 360: Roof layer | 362: Upper part of roof layer |
| 364: Side wall part of roof layer | 366: Outer part of roof layer |
| 370: Third insulating layer | 390: Encapsulation layer |
| 401: Opening | |

What is claimed is:

1. A display device, comprising:
a substrate including a pixel column comprising a plurality of pixel areas;
a thin film transistor formed on the substrate;
a pixel electrode connected to the thin film transistor and formed in a pixel area of the plurality of pixel areas;
a roof layer formed on the pixel electrode so as to be spaced apart from the pixel electrode;
a microcavity between the roof layer and the pixel electrode;
a first injection hole extending through the roof layer exposing the microcavity at a side edge of the pixel column, wherein the first injection hole is a throughhole;
a liquid crystal layer filling the microcavity; and
an encapsulation layer formed on the roof layer and covering the first injection hole to seal the microcavity,
wherein the microcavity has a tunnel shape, which extends along the pixel column.

2. The display device of claim 1, wherein:
the roof layer includes
an upper part covering an upper surface of the microcavity, and
a side wall part covering a side surface of the microcavity.

3. The display device of claim 2, wherein:
the pixel column is one of a plurality of pixel columns included on the substrate, and at least two of the plurality of pixel columns are adjacent,
the upper part is formed along the pixel column, and
the side wall part is formed between the at least two adjacent pixel columns.

4. The display device of claim 3, further comprising:
an additional first injection hole formed at a second side edge of the pixel column opposite the side edge where the first injection hole is positioned.

5. The display device of claim 3, further comprising:
an opening formed at the upper part of the roof layer so as to expose the microcavity.

6. The display device of claim 5, wherein:
at least two of the plurality of pixel areas are vertically adjacent, and
the opening is positioned on the thin film transistor or between the at least two vertically adjacent pixel areas.

7. The display device of claim 3, further comprising:
a second injection hole formed in the roof layer exposing the microcavity between the at least two adjacent pixel column.

8. The display device of claim 7, wherein:
the second injection hole positioned at a left side of the pixel column is different from the second injection hole positioned at a right side of the pixel column in a shape or a size.

9. The display device of claim 7, wherein:
the formation position of the second injection hole positioned at the left side of the pixel column and the formation position of the second injection hole positioned at the right side of the pixel column are asymmetrical to each other.

10. The display device of claim 3, wherein the microcavity is one of a plurality of microcavities, further comprising:
a passage formed through the side wall part connecting microcavities positioned in different pixel columns.

11. The display device of claim 3, wherein:
the microcavity is formed in a quadrangle including short sides corresponding to a length of one side of the pixel area and long sides corresponding to a length of the pixel column.

12. The display device of claim 11, wherein:
the microcavity is one of a plurality of microcavities,
long sides of the microcavities positioned in the different pixel columns have different lengths.

13. The display device of claim 3, wherein:
the first injection holes are formed at side edges of some pixel columns among the plurality of pixel columns, but are not formed at side edges of a remainder of the plurality of the pixel columns.

14. The display device of claim 3, wherein:
the shape of the first injection hole is a reverse triangle.

15. The display device of claim 3, further comprising:
a color filter overlapped with the pixel electrode; and
a light blocking member overlapped with the thin film transistor,
wherein a height of the color filter is larger than a height of the light blocking member.

16. The display device of claim 1, wherein:
at least two of the plurality of pixel areas are vertically adjacent, and
the roof layer is continuous over the at least two vertically adjacent pixel areas.

* * * * *